(12) United States Patent
Fraser

(10) Patent No.: US 9,115,009 B2
(45) Date of Patent: Aug. 25, 2015

(54) FLUID TREATMENT SYSTEM

(75) Inventor: Jim Fraser, St. Thomas (CA)

(73) Assignee: Trojan Technologies Inc., London (CA)

( * ) Notice: Subject to any disclaimer, the term of this patent is extended or adjusted under 35 U.S.C. 154(b) by 95 days.

(21) Appl. No.: 12/777,691

(22) Filed: May 11, 2010

(65) Prior Publication Data

US 2010/0282661 A1 Nov. 11, 2010

Related U.S. Application Data

(60) Provisional application No. 61/213,136, filed on May 11, 2009.

(51) Int. Cl.
*C02F 1/32* (2006.01)
*C02F 1/00* (2006.01)
(Continued)

(52) U.S. Cl.
CPC ................. *C02F 1/325* (2013.01); *C02F 1/004* (2013.01); *C02F 1/38* (2013.01); *C02F 1/44* (2013.01); *C02F 2103/008* (2013.01);
(Continued)

(58) Field of Classification Search
CPC ............ C02F 1/004; C02F 1/325; C02F 1/38; C02F 1/44; C02F 2303/04; C02F 2201/003; C02F 2201/3222; C02F 2201/3223; C02F 2201/3227; C02F 2103/008
USPC ......... 210/186, 748.01–748.1, 109, 136, 138, 210/143, 198.1, 202, 203, 257.1, 261, 262, 210/209, 234, 235, 256, 295, 315, 323.2, 210/327, 331, 342; 422/24, 186.3; 250/430, 250/434, 436, 438, 432 R, 435
See application file for complete search history.

(56) References Cited

U.S. PATENT DOCUMENTS

| | | | | |
|---|---|---|---|---|
| 6,419,821 B1 * | 7/2002 | Gadgil et al. | ................... | 210/86 |
| 6,451,202 B1 | 9/2002 | Kuennen et al. | | |
| 6,514,420 B2 * | 2/2003 | Kuennen et al. | ......... | 210/748.11 |
| 6,602,425 B2 * | 8/2003 | Gadgil et al. | ................. | 210/744 |

(Continued)

FOREIGN PATENT DOCUMENTS

MD 3726 F1 10/2008
WO 2006/108600 A1 10/2006

OTHER PUBLICATIONS

Written Opinion for PCT/CA2010/000701, mailed Sep. 24, 2010 (9 pages).
Canadian Office Action dated Nov. 23, 2012.

*Primary Examiner* — Walter D Griffin
*Assistant Examiner* — Cameron J Allen
(74) *Attorney, Agent, or Firm* — Katten Muchin Rosenman LLP

(57) ABSTRACT

There is described a fluid treatment system comprising: (i) a fluid inlet; (ii) a fluid outlet; and (iii) a fluid treatment zone in fluid communication with the fluid inlet and the fluid outlet. The fluid treatment zone comprises a housing within which is disposed a fluid separation section (the separation section may include a single separation device or a combination of two or more similar or dissimilar separation devices) and a fluid radiation section in fluid communication with one another. The fluid separation section removes solids in the fluid and the fluid radiation section irradiates the fluid to deactive microorganisms in the fluid. The fluid separation section and the fluid radiation section are configured to have a substantially common fluid flow path which significantly reduces the space or footprint requirement of and/or significantly reduces hydraulic head loss (pressure drops) in the overall fluid treatment system while allowing the two sections to perform their respective functions.

28 Claims, 24 Drawing Sheets

(51) Int. Cl.
    *C02F 1/38*     (2006.01)
    *C02F 1/44*     (2006.01)
    *C02F 103/00*     (2006.01)

(52) U.S. Cl.
    CPC .. *C02F 2201/003* (2013.01); *C02F 2201/3222* (2013.01); *C02F 2201/3223* (2013.01); *C02F 2201/3227* (2013.01); *C02F 2303/04* (2013.01)

(56) References Cited

U.S. PATENT DOCUMENTS

| | | | |
|---|---|---|---|
| 2004/0011724 A1* | 1/2004 | Engelhard et al. | 210/323.2 |
| 2005/0247609 A1* | 11/2005 | Laing et al. | 210/109 |
| 2007/0125692 A1* | 6/2007 | Snyder | 210/198.1 |
| 2008/0264875 A1* | 10/2008 | NeCamp | 210/748 |

* cited by examiner

FLUID TREATMENT SYSTEM

CROSS-REFERENCE TO RELATED APPLICATION

The present application claims the benefit under 35 U.S.C. §119(e) of provisional patent application Ser. No. 61/213,136, filed May 11, 2009, the contents of which are hereby incorporated by reference.

BACKGROUND OF THE INVENTION

1. Field of the Invention

The present invention relates to a fluid treatment system. More particularly, the present invention relates to a fluid treatment system for treatment of liquids such as water. Even more particularly, the present invention relates to a fluid treatment system for treatment of water such as ballast water from marine vessels.

2. Description of the Prior Art

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

relatively high capital cost of reactor;
difficult accessibility to submerged reactor and/or wetted equipment (lamps, sleeve cleaners, etc);
difficulties associated with removal of fouling materials from fluid treatment equipment;
relatively low fluid disinfection efficiency, and/or
full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 Patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open to provide free-surface flow of fluid in a "top open" channel.

The fluid treatment system taught in the Maarschalkerweerd #1 Patents is characterized by having a free-surface flow of fluid (typically the top fluid surface was not purposely controlled or constrained). Thus, the systems would typically follow the behaviour of open channel hydraulics. Since the design of the system inherently comprised a free-surface flow of fluid, there were constraints on the maximum flow each lamp or lamp array could handle before either one or other hydraulically adjoined arrays would be adversely affected by changes in water elevation. At higher flows or significant changes in the flow, the unrestrained or free-surface flow of fluid would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re36,896 (all in the name of Maarschalkerweerd and all assigned to the assignee of the present invention and hereinafter referred to as the Maarschalkerweerd #2 Patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

The Maarschalkerweerd #2 Patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 Patents was typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

Historically, the fluid treatment modules and systems described in the Maarschalkerweerd #1 and #2 Patents have found widespread application in the field of municipal waste water treatment (i.e., treatment of water that is discharged to a river, pond, lake or other such receiving stream).

In the field of municipal drinking water, it is known to utilize so-called "closed" fluid treatment systems or "pressurized" fluid treatment systems.

Closed fluid treatment devices are known—see, for example, U.S. Pat. No. 5,504,335 (Maarschalkerweerd #3). Maarschalkerweerd #3 teaches a closed fluid treatment device comprising a housing for receiving a flow of fluid. The housing comprises a fluid inlet, a fluid outlet, a fluid treatment zone disposed between the fluid inlet and the fluid outlet, and at least one radiation source module disposed in the fluid treatment zone. The fluid inlet, the fluid outlet and the fluid treatment zone are in a collinear relationship with respect to one another. The at least one radiation source module comprises a radiation source sealably connected to a leg which is sealably mounted to the housing. The radiation source is disposed substantially parallel to the flow of fluid.

U.S. Pat. No. 6,500,346 [Taghipour et al. (Taghipour)] also teaches a closed fluid treatment device, particularly useful for ultraviolet radiation treatment of fluids such as water. The device comprises a housing for receiving a flow of fluid. The housing has a fluid inlet, a fluid outlet, a fluid treatment zone disposed between the fluid inlet and the fluid outlet and at least one radiation source having a longitudinal axis disposed in the fluid treatment zone substantially transverse to a direction of the flow of fluid through the housing. The fluid inlet, the fluid outlet and the fluid treatment zone are arranged substantially collinearly with respect to one another. The fluid inlet has a first opening having: (i) a cross-sectional area less than a cross-sectional area of the fluid treatment zone, and (ii) a largest diameter substantially parallel to the longitudinal axis of the at least one radiation source assembly.

The various embodiments described in the Maarshalkerweerd #1 Patents, the Maarschalkerweerd #2 Patents and the Maarschalkerweerd #3 Patents relate to land-based fluid radiation treatment systems. Typically, the fluid radiation treatment systems are used in conjunction with other treatment systems in the municipal wastewater treatment plant or the municipal drinking water treatment plant, as the case may be. In such installations, various conduit systems and the like are used to interconnect the fluid radiation treatment system to the other fluid treatment systems in the installation.

It is conventional in such installations to compartmentalize each treatment system in the installation such that each treatment system is configured to create its own optimized flow fluid. This approach has been satisfactory for land-based fluid treatment systems.

A problem arises in applications of fluid treatment systems where a very small footprint is available for overall fluid treatment. This problem arises particularly when it is desired to treat ballast water in shipping vessels.

The continuous introduction and spread of aquatic non-indigenous species is a serious threat to the marine environment. Unlike other forms of pollution, once a non-indigenous species establishes itself, it will remain in its new location. While calculating the potential side effects on human food supply, economy, health and overall biodiversity is difficult, there is widespread acceptance that the cost could be staggering.

One primary culprit for introduction and spread of aquatic non-indigenous species is due to unabated transferance of ballast water from shipping vessels. Ballast water taken on in one body of water or ecological zone and released into another body of water or ecological zone can introduce so-called Aquatic Invasive Species (AIS) that has the potential to cause detrimental impact on one or more of the biodiversity, economy and human health of the receiving community.

Typically, a shipping vessel will take on ballast water (fresh water and/or salt water) and at a source point and hold this in onboard ballast tanks and/or cargo holds to increase stability and maneuverability during transit. Once the shipping vessel arrives at its destination point, the ballast water is typically discharged from the onboard ballast tanks and/or cargo holds. Also, it is common for ballast water to be taken on and/or discharged during transit between the source point and the destination point. It has been estimated that 3-5 billon tonnes of ballast water is transferred in this manner on an annual basis.

It would be desirable to have an onboard system capable of treating the ballast water to reduce the indigenous AIS transferred from the source point to the destination point (or to points therebetween). Such a system would need to include the major treatment systems and need to be able to occupy only a very small footprint on the shipping vessel.

SUMMARY OF THE INVENTION

It is an object of the present invention to obviate or mitigate at least one of the above-mentioned disadvantages of the prior art.

It is another object of the present invention to provide a novel fluid treatment system.

Accordingly, in one of its aspects, the present invention provides a fluid treatment system comprising: (i) a fluid inlet; (ii) a fluid outlet; and (iii) a fluid treatment zone in fluid communication with the fluid inlet and the fluid outlet, the fluid treatment zone comprising a housing within which is disposed a fluid separation section (the separation section may include a single separation device or a combination of two or more similar or disimilar separation devices) and a fluid radiation section in fluid communication with one another.

In another of its aspects, the present invention provides a fluid treatment system comprising: a fluid inlet; a fluid outlet; and a closed fluid treatment zone in fluid communication with the fluid inlet and the fluid outlet, the fluid treatment zone comprising a housing, the housing comprising (a) a first chamber in fluid communication with the fluid inlet and within which is disposed at least one fluid separation section (the separation section may include a single separation device or a combination of two or more similar or disimilar separation devices), and (b) a second chamber in fluid communication with the fluid outlet and the first chamber, the second chamber having disposed therein at least one radiation source assembly;

wherein the first chamber and the second chamber are disposed substantially coaxially with respect to one another.

Thus, the present inventor has developed a fluid treatment system which, in a general sense, includes a fluid separation section and a fluid radiation section. The fluid separation section removes solids in the fluid and the fluid radiation section irradiates the fluid to deactive microorganisms and/or contaminants in the fluid. Importantly, the fluid separation section and the fluid radiation section are configured to have a substantially common fluid flow path which significantly reduces the space or footprint requirement of and/or significantly reduces hydraulic head loss (pressure drops) in the overall fluid treatment system while allowing the two sections to perform their respective functions.

This can be understood with references to FIGS. 23 and 24. FIGS. 23 illustrates a conventional flow wherein a fluid separation section and fluid radiation section are physically independent and are interconnected by intermediate pipe 2. The fluid separation section and fluid radiation section each must establish their own fluid flow for proper operation of the section. This results in significant oscillation of fluid pressure between inlet pipe 1 and outlet pipe 3. In contrast, with reference to FIG. 24, by combining the fluid separation section and fluid radiation section as shown, the oscillation of fluid pressure between inlet pipe 1 and outlet pipe 3 is obviated or mitigated. This allows for the two sections to perform their respective functions which significantly reduces the space or footprint requirement for the overall fluid treatment system.

In many cases, the fluid separation section and the fluid radiation section are contained in a unitary house or enclosure that is configured to created a "developed fluid flow" between both sections. By "developed fluid flow" is meant that the general hydrodynamics of the flow fluid are substantially developed in the fluid separation section and do not need to be fully redeveloped in the fluid radiation section.

Preferably, the fluid treatment system is adapted for treatment of liquid, more preferably water.

The separation section of the present fluid treatment system serves to remove solids from the fluid. Thus, this section can incorporate a wide variety of physical separation components—e.g., a filter, a membrane and the like. The physical design of the separation components is variable—e.g., they may be cylindrically shaped or they may be non-cylindrically shape (curved or planar). The separation section may include a single separation device or a combination of two or more similar or disimilar separation devices.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
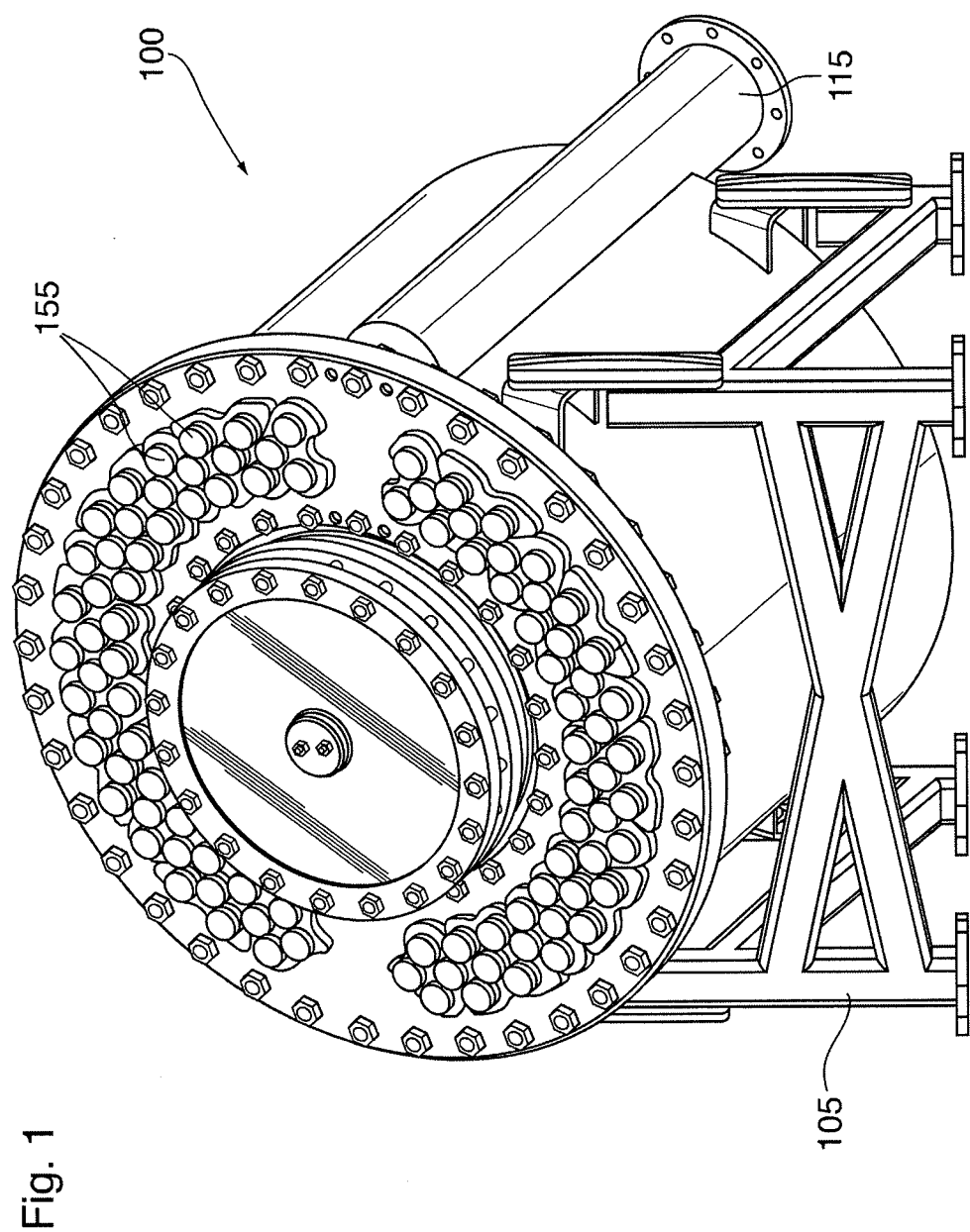
FIGS. 1-9 illustrate various views of a first embodiment of the present fluid treatment system, including various views of components of the fluid treatment system.
Figure 2:
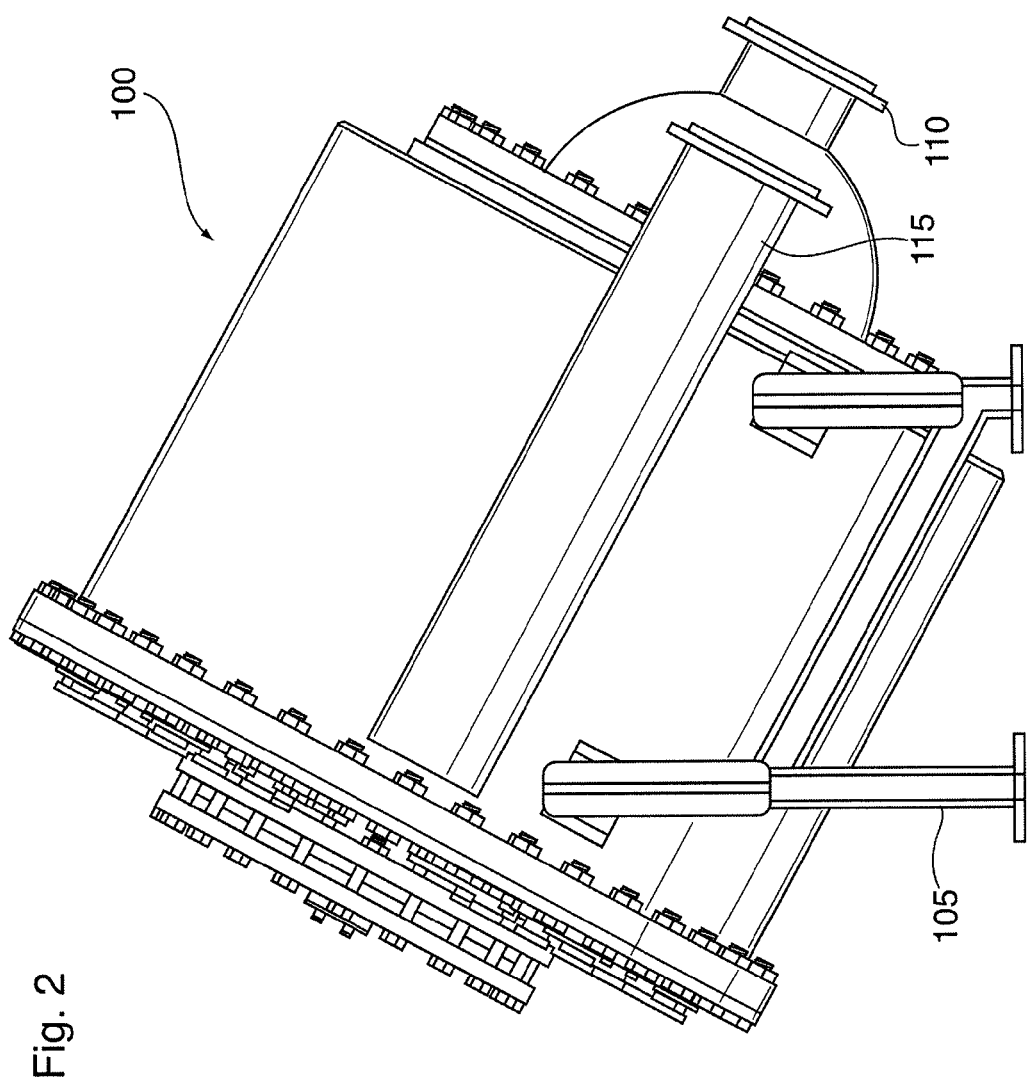
Figure 3:
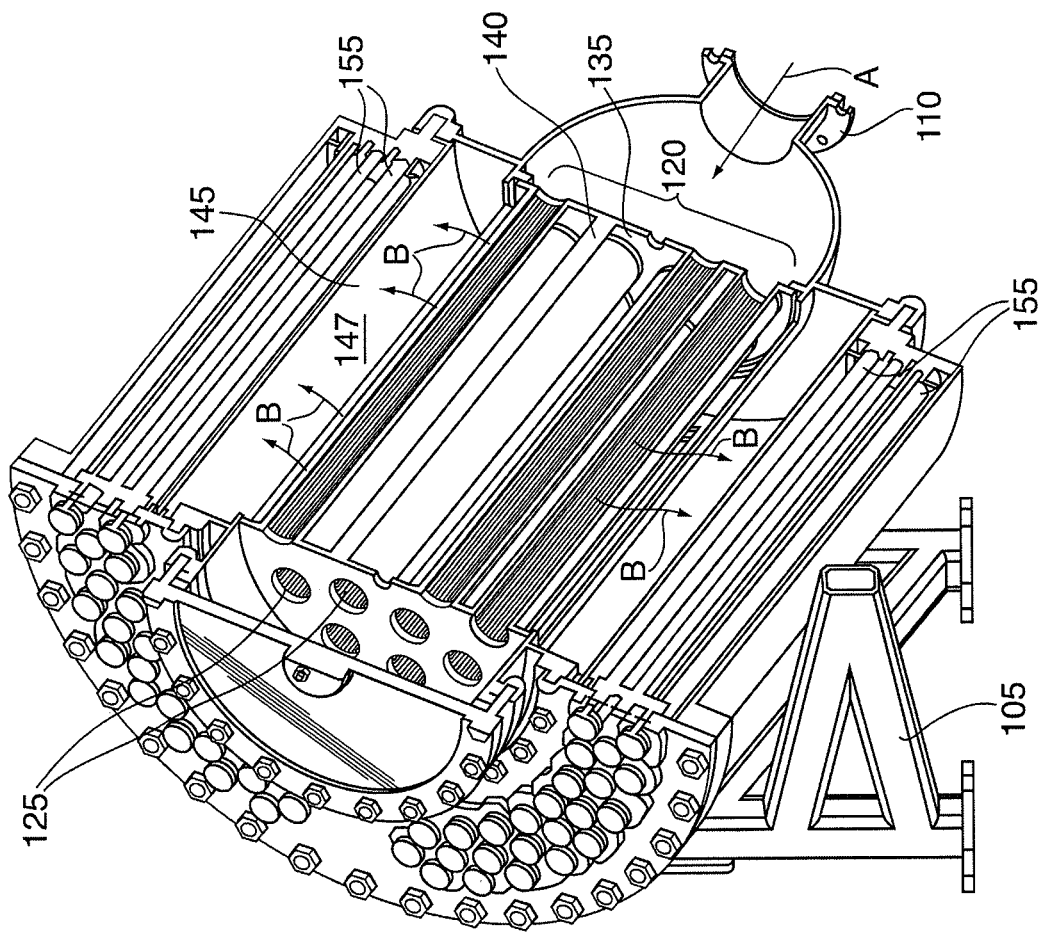
Figure 4:
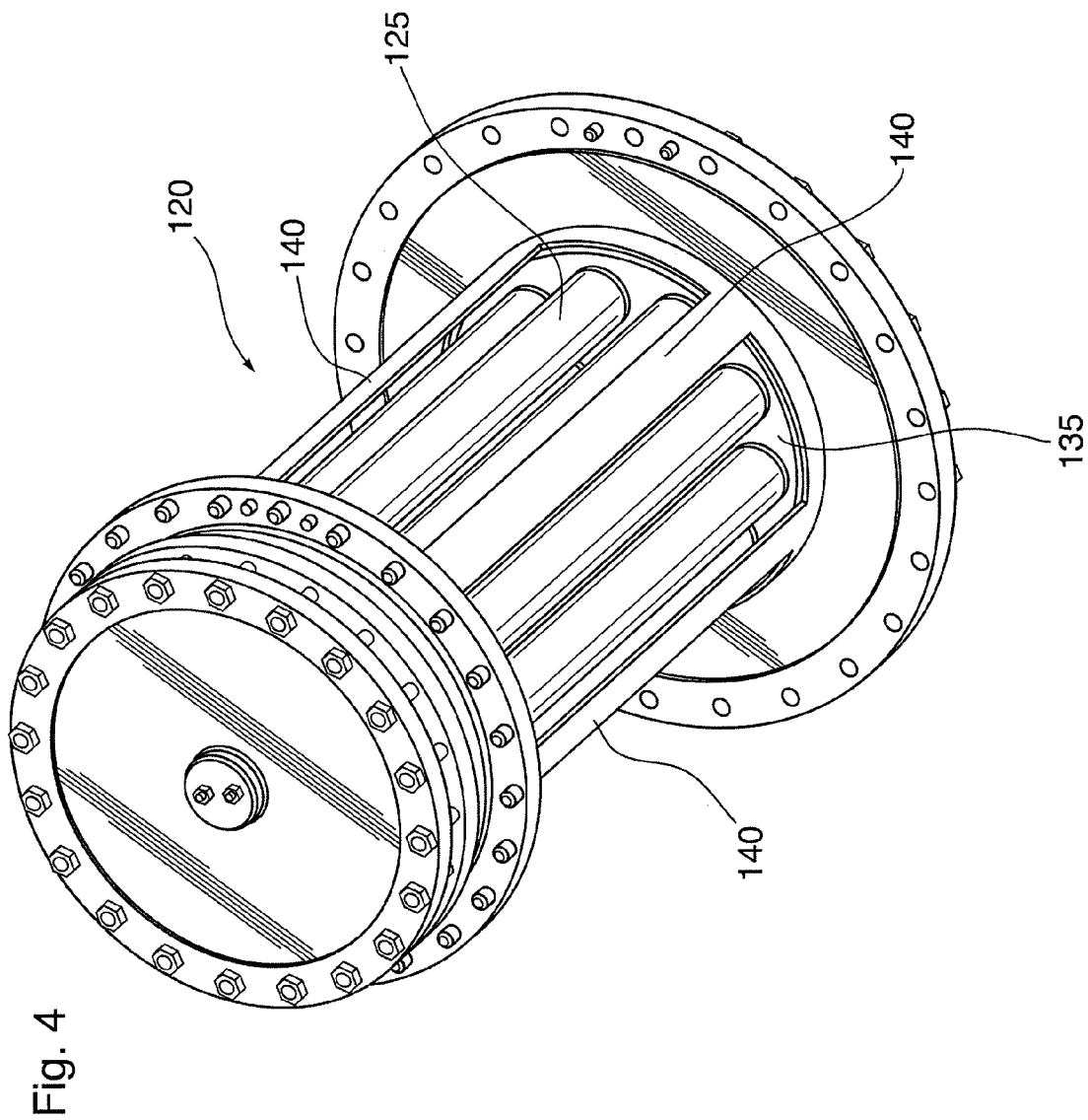
Figure 5:
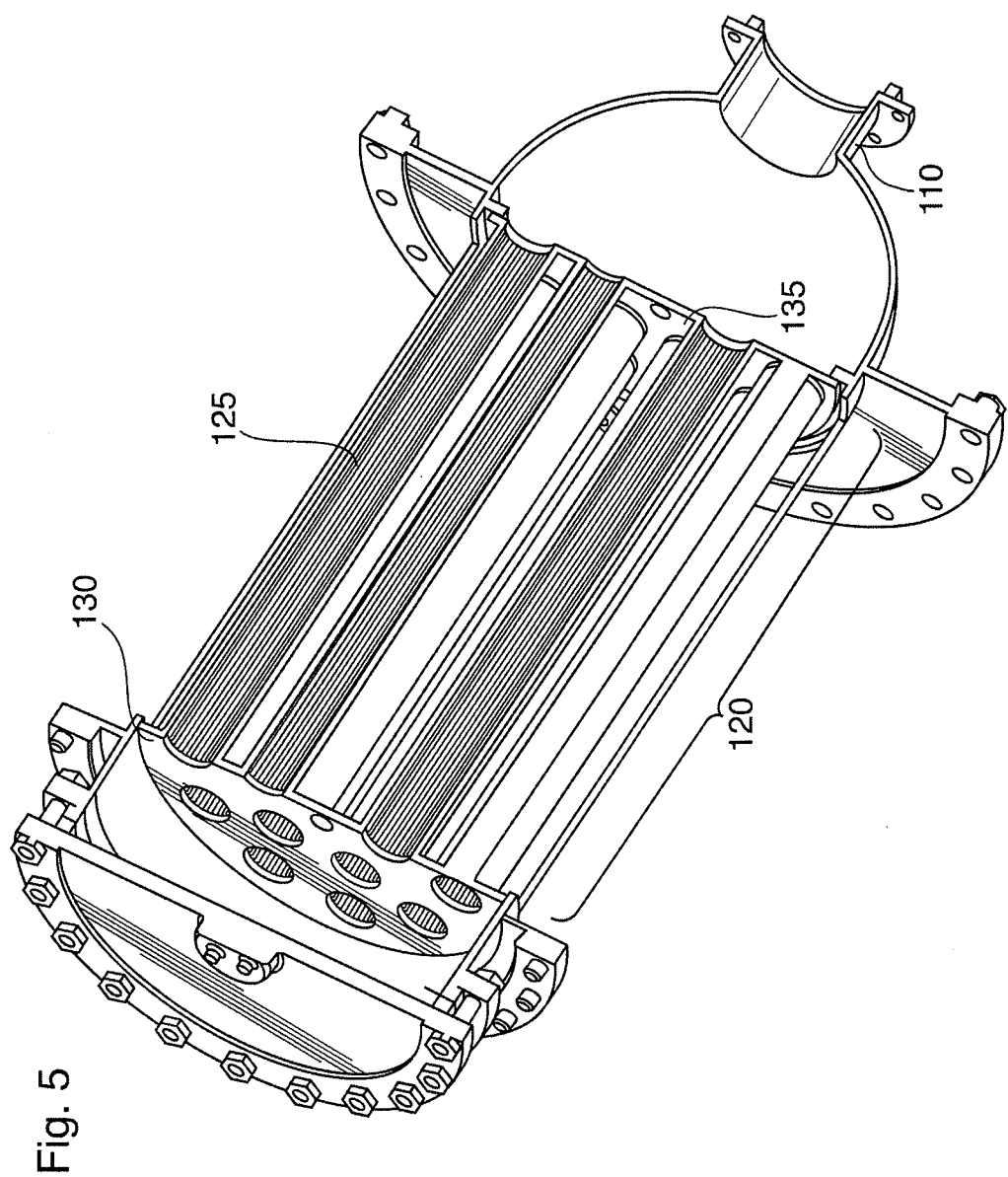

In one of its aspects, the present invention relates to a fluid treatment system fluid treatment system comprising: (i) a fluid inlet; (ii) a fluid outlet; and (iii) a fluid treatment zone in fluid communication with the fluid inlet and the fluid outlet, the fluid treatment zone comprising a housing within which is disposed a fluid separation section and a fluid radiation section in fluid communication with one another. Preferred embodiments of this embodiment of the present invention may include any one or a combination of any two or more any of the following features:

the fluid separation section may be in fluid communication with the fluid inlet;
the fluid radiation section may be in fluid communication with the fluid outlet;
the fluid separation section may be in fluid communication with the fluid inlet, and the fluid radiation section is in fluid communication with the fluid outlet;
the fluid treatment zone may be configured to receive a pressurized flow of fluid;
the fluid treatment zone may be configured to constrain on all sides a flow of fluid received from the fluid inlet;
the fluid separation section may comprise a filter element (e.g., bag filtration, cartridge filtration with a wide variety of filtering materials, ceramic filtration, screen filtration, woven wire filtration, cloth filtration, wedgwire filtration, plastic filtration granular filtration (sacrificial and non-sacrificial) and any combination of two or more of these);
the fluid separation section may comprise a cyclone element;
the fluid separation section may comprise a membrane element;
the fluid separation section may comprise at least one candle filter;
the at least one candle filter may comprise an elongate filter housing having an filter inlet in fluid communication with the fluid inlet and a filter outlet in fluid communication with fluid radiation section;
the filter housing may comprise a substantially cylindrical portion;
the elongate filter housing may be fluid permeable between the filter inlet and the filter outlet to allow for fluid to pass laterally from an interior to an exterior of the filter housing or from an exteriod to an interior of the filter housing;
the filter housing may comprise a filter element on an inner surface of the filter housing;
the filter housing may comprise a filter element on substantially an entire inner surface of the filter housing;
the filter element may comprise a ceramic material;
the filter element may comprise a porous ceramic material;
the filter element may comprise a metal tube;
the filter element may comprise a sintered metal tube;
the filter element may comprise an expanded sheet material;
the filter element comprises an expanded metal sheet material;
the filter element may comprise a mesh screen;
the filter element may comprise a woven mesh screen;
the filter element may comprise a filter cloth material;
the filter element may comprise a non-undulating surface;
the filter element may comprise an undulating surface;
the fluid separation section may comprise a plurality of separation elements arranged in a separation element array;
each separation element may be configured to receive a flow of fluid;
each separation element may be configured to receive an independent flow of fluid with respect to an adjacent separation element;
each separation element may be elongate;
each separation element may comprise a longitudinal axis that is substantially parallel with respect to a longitudinal axis of at least two adjacent separation elements;
each separation element may comprise a longitudinal axis that is substantially equidistant from longitudinal axis of three adjacent separation elements;
each separation element may comprise a longitudinal axis that is substantially equidistant from longitudinal axis of four adjacent separation elements;
each separation element may comprise a longitudinal axis that is substantially equidistant from longitudinal axis of five adjacent separation elements;
the fluid radiation section may comprise at least one elongate radiation source assembly;
the at least one elongate radiation source assembly may comprise at least one elongate radiation source;

the at least one elongate radiation source may comprise an ultraviolet radiation source;

the ultraviolet radiation source may comprise a low pressure ultraviolet radiation lamp;

the ultraviolet radiation source may comprise a low pressure high output ultraviolet radiation lamp;

the ultraviolet radiation source may comprise a medium pressure ultraviolet radiation lamp;

the ultraviolet radiation source may comprise a dielectric barrier discharge (DBD) ultraviolet radiation lamp;

the ultraviolet radiation source may comprise an ultraviolet radiation light emitting diode (LED) or an array of ultraviolet radiation LEDs;

the at least one elongate radiation source may be disposed in a protective sleeve;

the protective sleeve may be constructed of a radiation transparent material;

the protective sleeve may be constructed of quartz;

the elongate radiation source assembly may comprise a longitudinal axis that is configured to be transverse to the direction of fluid flow through the fluid radiation section;

the elongate radiation source assembly may comprise a longitduinal axis that is configured to be orthogonal to the direction of fluid flow through the fluid radiation section;

the fluid treatment system may comprise a plurality of radiation source assemblies;

the plurality of radiation source assemblies may be arranged in a radiation source array;

the array may comprise a central portion in which is disposed the fluid separation section;

the fluid separation section and the fluid radiation section may be disposed serially along a direction of fluid flow through the fluid treatment zone;

the fluid separation section and the fluid radiation section may be disposed coaxially along a direction of fluid flow through the fluid treatment zone; and/or the fluid separation section and the fluid radiation section may be disposed coaxially along a direction of fluid flow through the fluid separation section.

In another of its aspects, the present invention provides a fluid treatment system comprising: a fluid inlet; a fluid outlet; and a closed fluid treatment zone in fluid communication with the fluid inlet and the fluid outlet, the fluid treatment zone comprising a housing, the housing comprising (a) a first chamber in fluid communication with the fluid inlet and within which is disposed at least one fluid separation section, and (b) a second chamber in fluid communication with the fluid outlet and the first chamber, the second chamber having disposed therein at least one radiation source assembly; wherein the first chamber and the second chamber are disposed substantially coaxially with respect to one another. Preferred embodiments of this embodiment of the present invention may include any one or a combination of any two or more any of the following features:

the first chamber may be disposed interiorly with respect to the second chamber;

the first chamber may be disposed exteriorly with respect to the second chamber;

the fluid treatment system may comprise a wall to separate the first chamber and the second chamber;

the fluid treatment system may comprise a common wall to separate the first chamber and the second chamber;

the wall may be substantially cylindrical;

the wall may comprise at least one opening to permit fluid to pass from the first chamber to the second chamber;

the at least one opening may have a major dimension and a minor dimension that is less than the major dimension;

the major dimension may be in substantial alignment with a longitudinal axis of the at least one radiation source assembly;

the major dimension and an arc length of the at least one radiation source assembly may be substantially the same;

the major dimension and an arc length of the at least one radiation source assembly may be different;

the first chamber may comprise a plurality of separation elements;

the second chamber may comprise a plurality of radiation source assemblies;

the second chamber has a substantially annular configuration with respect to the first chamber;

the fluid treatment zone may be configured to receive a pressurized flow of fluid;

the fluid treatment zone may be configured to constrain on all sides a flow of fluid received from the fluid inlet;

the fluid separation section may comprise a filter element (e.g., bag filtration, cartridge filtration with a wide variety of filtering materials, ceramic filtration, screen filtration, woven wire filtration, cloth filtration, wedgwire filtration, plastic filtration granular filtration (sacrificial and non-sacrificial) and any combination of two or more of these);

the fluid separation section may comprise a cyclone element;

the fluid separation section may comprise a membrane element;

the fluid separation section may comprise at least one candle filter;

the at least one candle filter may comprise an elongate filter housing having an filter inlet in fluid communication with the fluid inlet and a filter outlet in fluid communication with fluid radiation section;

the filter housing may comprise a substantially cylindrical portion;

the elongate filter housing may be fluid permeable between the filter inlet and the filter outlet to allow for fluid to pass laterally from an interior to an exterior of the filter housing or from an exteriod to an interior of the filter housing;

the filter housing may comprise a filter element on an inner surface of the filter housing;

the filter housing may comprise a filter element on substantially an entire inner surface of the filter housing;

the filter element may comprise a ceramic material;

the filter element may comprise a porous ceramic material;

the filter element may comprise a metal tube;

the filter element may comprise a sintered metal tube;

the filter element may comprise an expanded sheet material;

the filter element comprises an expanded metal sheet material;

the filter element may comprise a mesh screen;

the filter element may comprise a woven mesh screen;

the filter element may comprise a filter cloth material;

the filter element may comprise a non-undulating surface;

the filter element may comprise an undulating surface;

the fluid separation section may comprise a plurality of separation elements arranged in a separation element array;

each separation element may be configured to receive a flow of fluid;

each separation element may be configured to receive an independent flow of fluid with respect to an adjacent separation element;

each separation element may be elongate;

each separation element may comprise a longitudinal axis that is substantially parallel with respect to a longitudinal axis of at least two adjacent separation elements;

each separation element may comprise a longitudinal axis that is substantially non-parallel with respect to a longitudinal axis of at least two adjacent separation elements;

each separation element may comprise a longitudinal axis that is substantially equidistant from longitudinal axis of three adjacent separation elements;

each separation element may comprise a longitudinal axis that is substantially equidistant from longitudinal axis of four adjacent separation elements;

each separation element may comprise a longitudinal axis that is substantially equidistant from longitudinal axis of five adjacent separation elements;

the fluid radiation section may comprise at least one elongate radiation source assembly;

the at least one elongate radiation source assembly may comprise at least one elongate radiation source;

the at least one elongate radiation source may comprise an ultraviolet radiation source;

the ultraviolet radiation source may comprise a low pressure ultraviolet radiation lamp;

the ultraviolet radiation source may comprise a low pressure high output ultraviolet radiation lamp;

the ultraviolet radiation source may comprise a medium pressure ultraviolet radiation lamp;

the ultraviolet radiation source may comprise a dielectric barrier discharge (DBD) ultraviolet radiation lamp;

the ultraviolet radiation source may comprise an ultraviolet radiation light emitting diode (LED) or an array of ultraviolet radiation LEDs;

the at least one elongate radiation source may be disposed in a protective sleeve;

the protective sleeve may be constructed of a radiation transparent material;

the protective sleeve may be constructed of quartz;

the elongate radiation source assembly may comprise a longitudinal axis that is configured to be transverse to the direction of fluid flow through the fluid radiation section;

the elongate radiation source assembly may comprise a longitudinal axis that is configured to be orthogonal to the direction of fluid flow through the fluid radiation section;

the fluid treatment system may comprise a plurality of radiation source assemblies;

the plurality of radiation source assemblies may be arranged in a radiation source array; and/or the array may comprise a central portion in which is disposed the fluid separation section.

With reference to FIGS. 1-9, there is illustrated a fluid treatment system 100. Fluid treatment system 100 is angularly mounted on a frame 105.

Fluid treatment system 100 comprises a fluid inlet 110 and a fluid outlet 115. Fluid inlet 110 is in communication with a filter element 120. Filter element 120 consists of a series of so-called candle filters 125. Candle filters 125 are secured by a pair of end plates 130,135 that are interconnected by a series of support elements 140.

Figure 6:
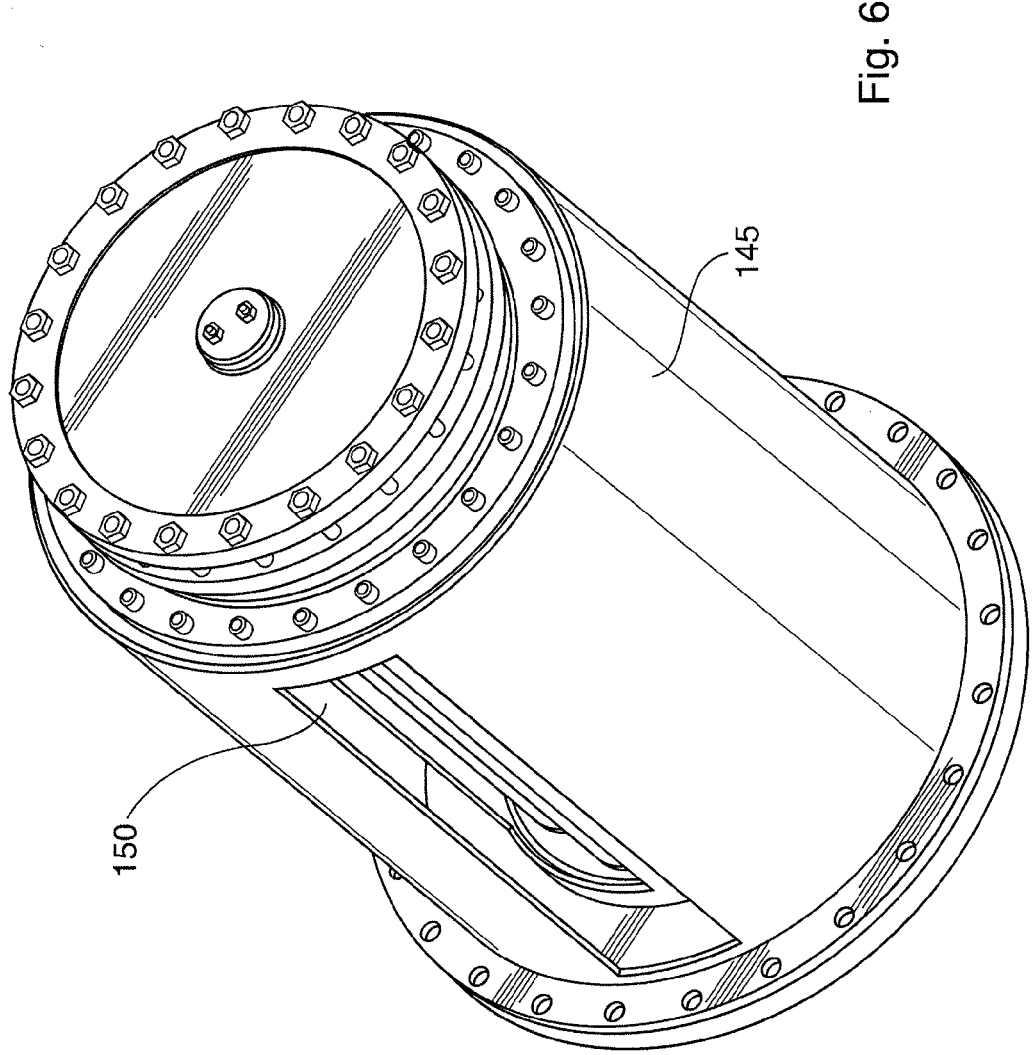
Figure 7:
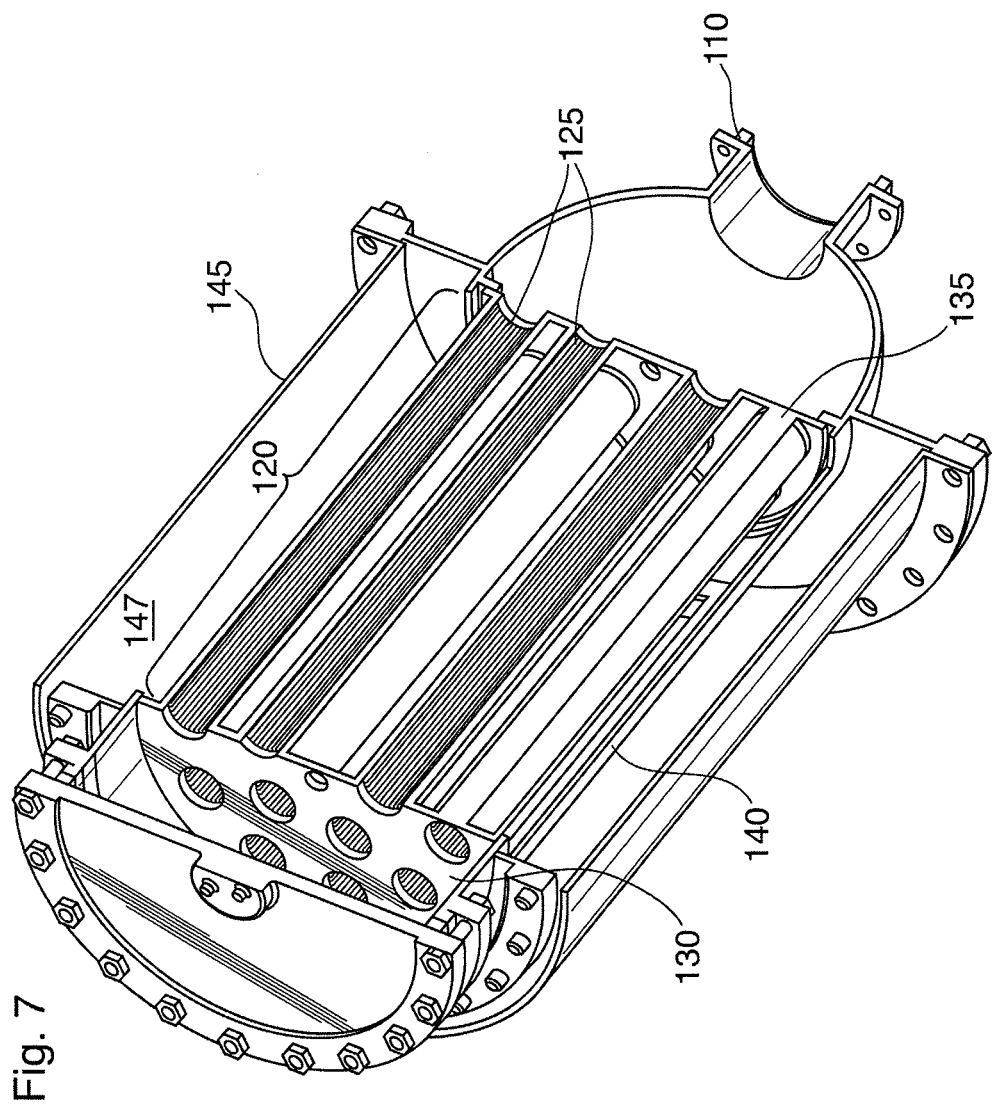
Figure 8:
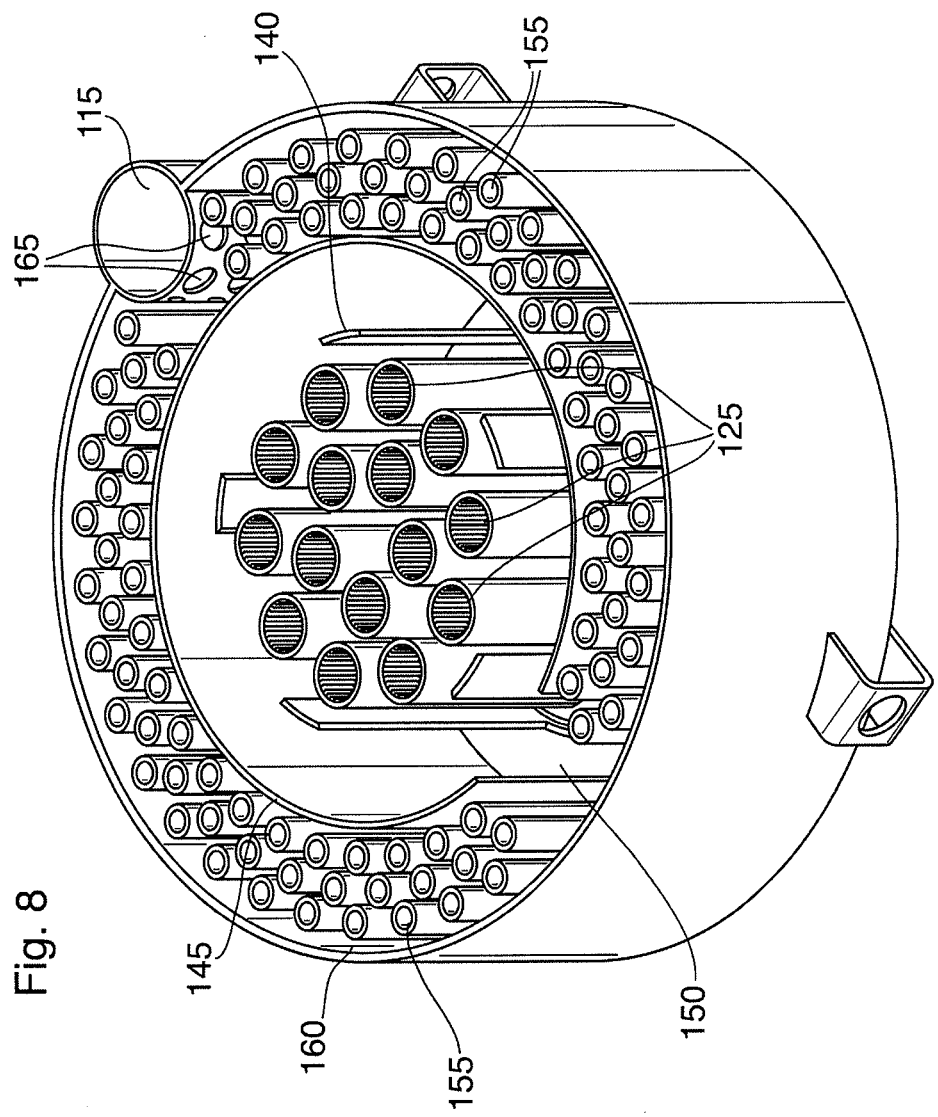

With reference to FIGS. 6 and 7, a shroud element 145 surrounds filter element 120 to define a spacing 147. Shroud element 145 comprises an opening 150 through which fluids may pass from spacing 147 after contacting candle filters 125 and filter element 120.

Fluid treatment system 100 further comprises a series of elongate radiation sources 155 (FIGS. 8 and 9) that are disposed annularly with respect to filter element 120. Radiation sources 155 are disposed in a chamber 160 that is in communication with fluid outlet 115 via a series of openings 165.

In use, fluid to be treated is fed to fluid inlet 110 in the direction of arrow A (FIG. 3), typically under pressure. Thereafter, the fluid passes into candle filters 125 of filter element 120. Upon pressurization of filter element 120, the fluid is filtered and passes laterally through each candle filter 125 via arrows B (FIGS. 3 and 9) into spacing 147 created between filter element 120 and shroud 145.

Figure 9:
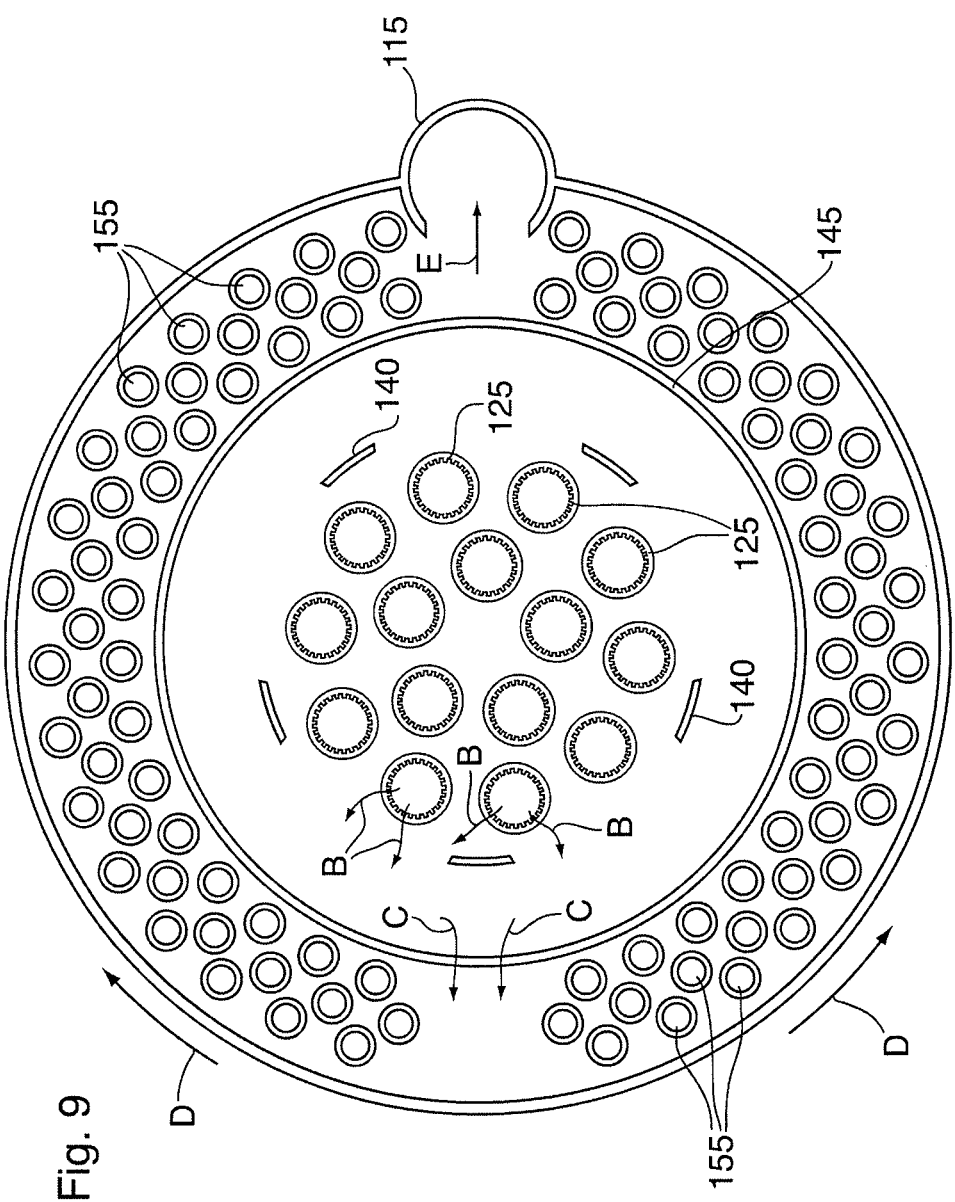
Figure 10:
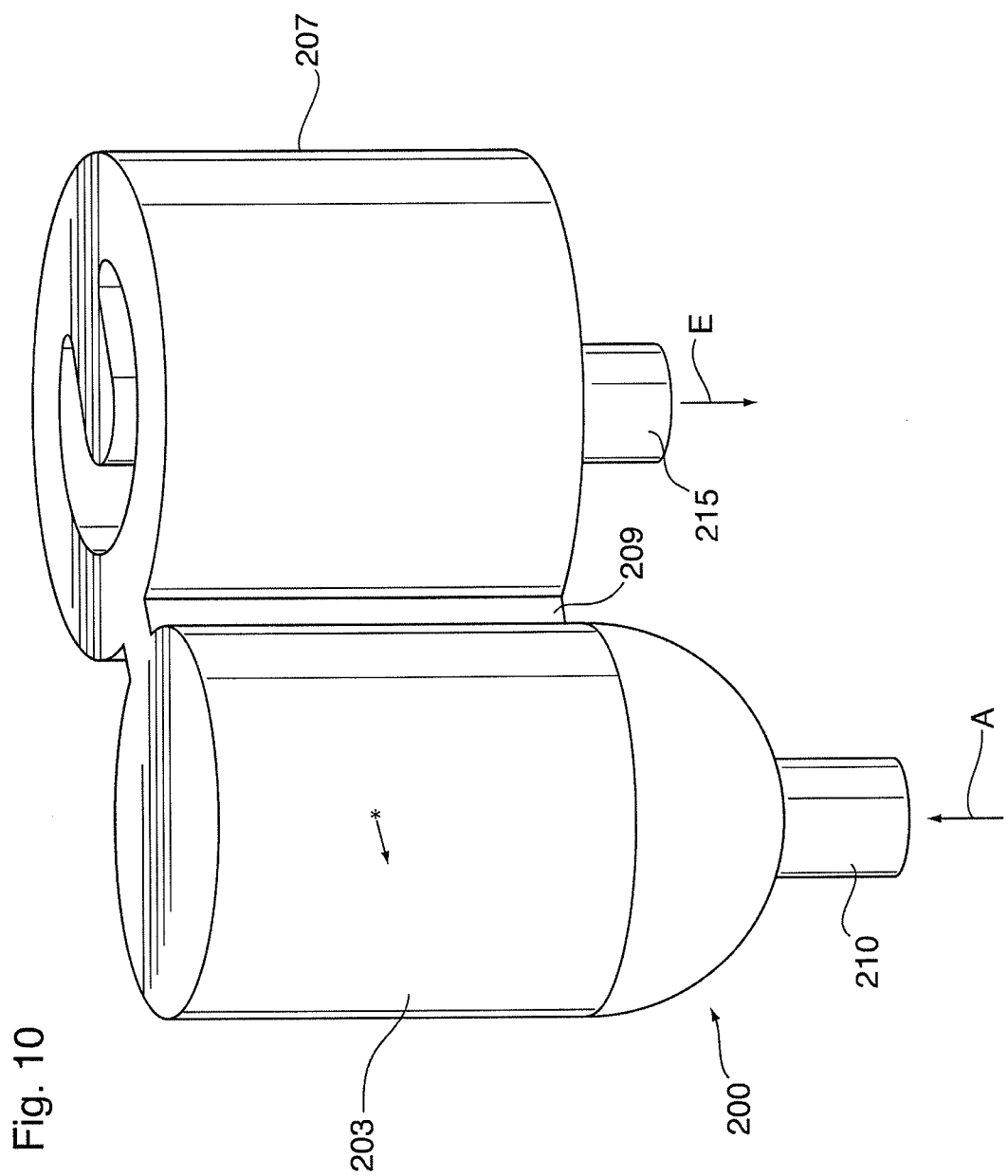
FIGS. 10-17 illustrate various views of a second embodiment of the present fluid treatment system, including various views of components of the fluid treatment system.

The pressurized fluid then exits opening 150 in shroud 145 via arrows C (FIG. 9) whereupon it is exposed to radiation from radiation sources 155 as it passes through chamber 160 toward fluid outlet 115 via arrows D (FIG. 9). The treated fluid then exits fluid outlet 115 via arrows E.

With reference to FIGS. 10-17, there is illustrated a fluid treatment system 200. In FIGS. 10-17, like parts from fluid treatment system 100 in FIGS. 1-9 have the same last two digits as like parts in fluid treatment system 200 (e.g., for example, radiation source assemblies 155 in fluid treatment system 100 are denoted as radiation source assemblies 255 in fluid treatment system 200, candle filters 125 in fluid treatment system 100 are denoted as candle filters 225 in fluid treatment system 200, etc.).

Figure 11:
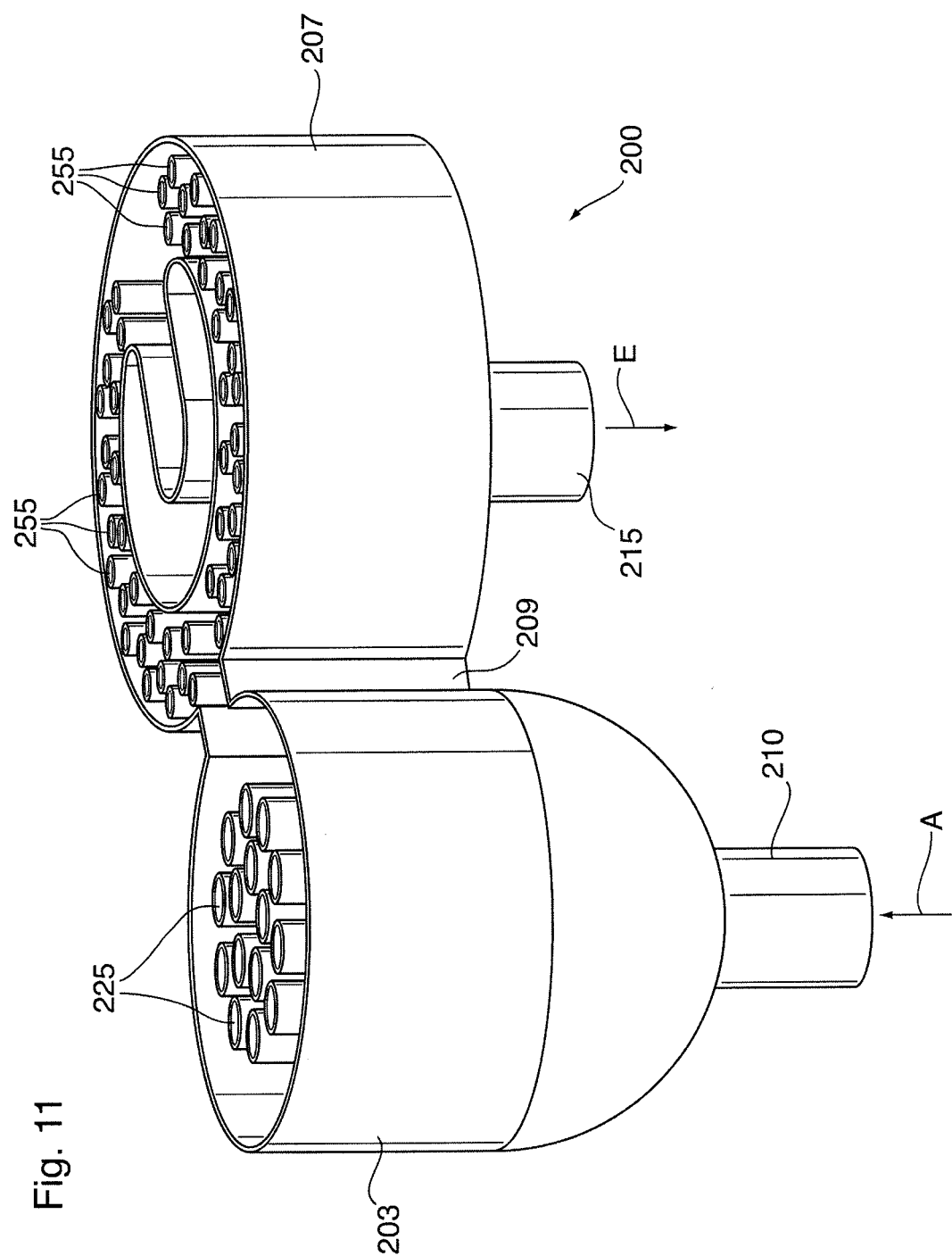
Figure 12:
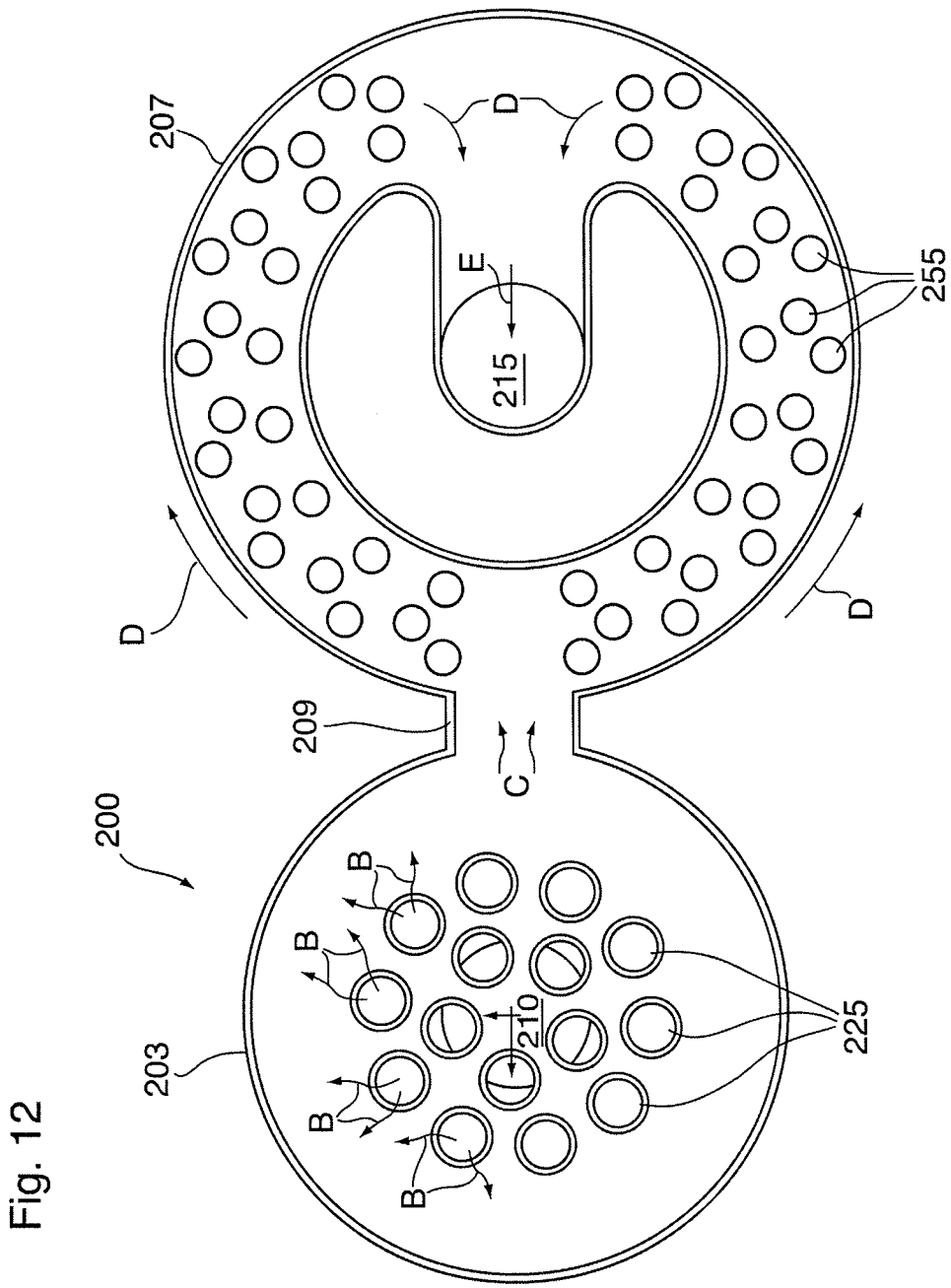
Figure 13:
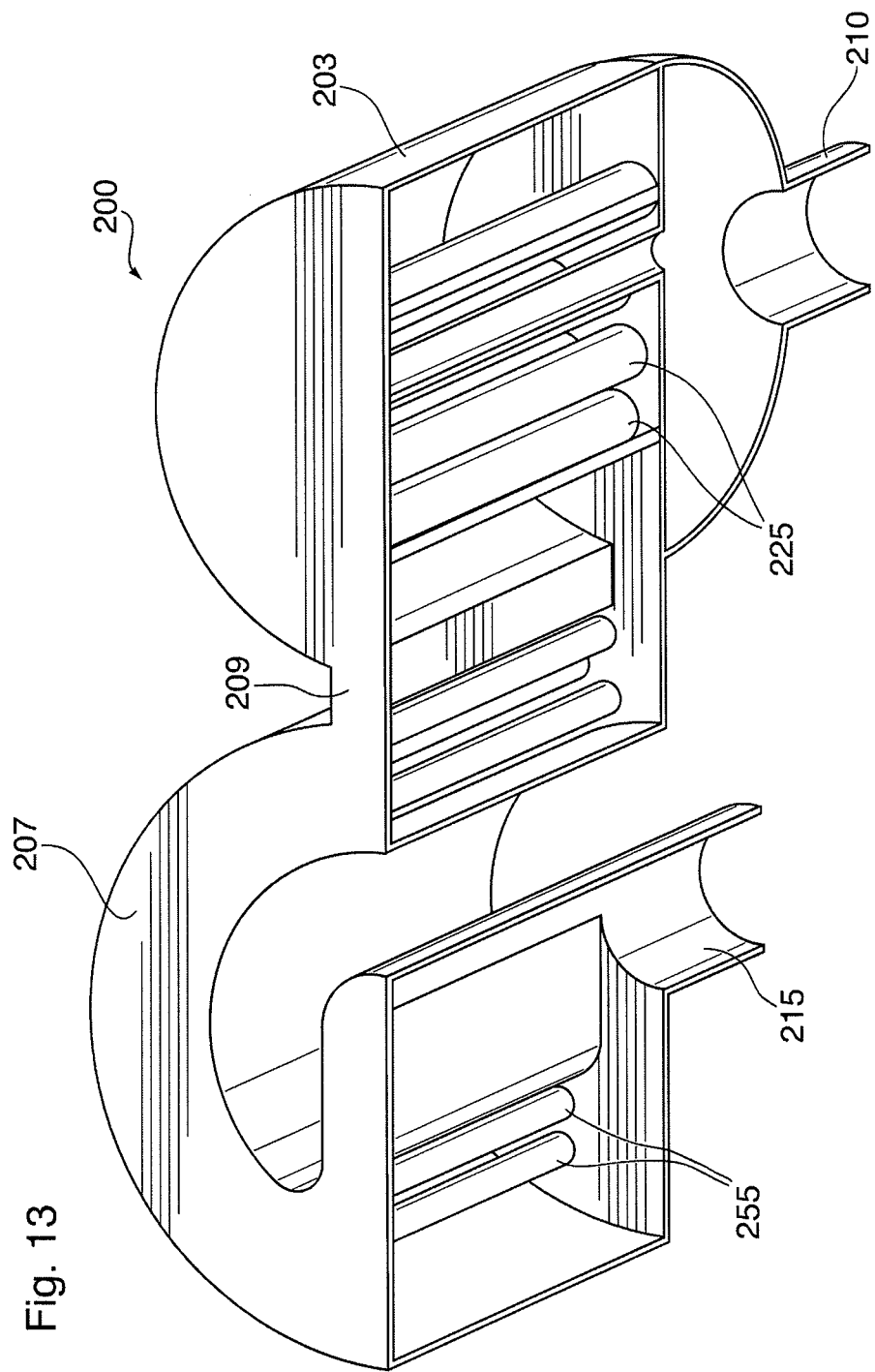
Figure 14:
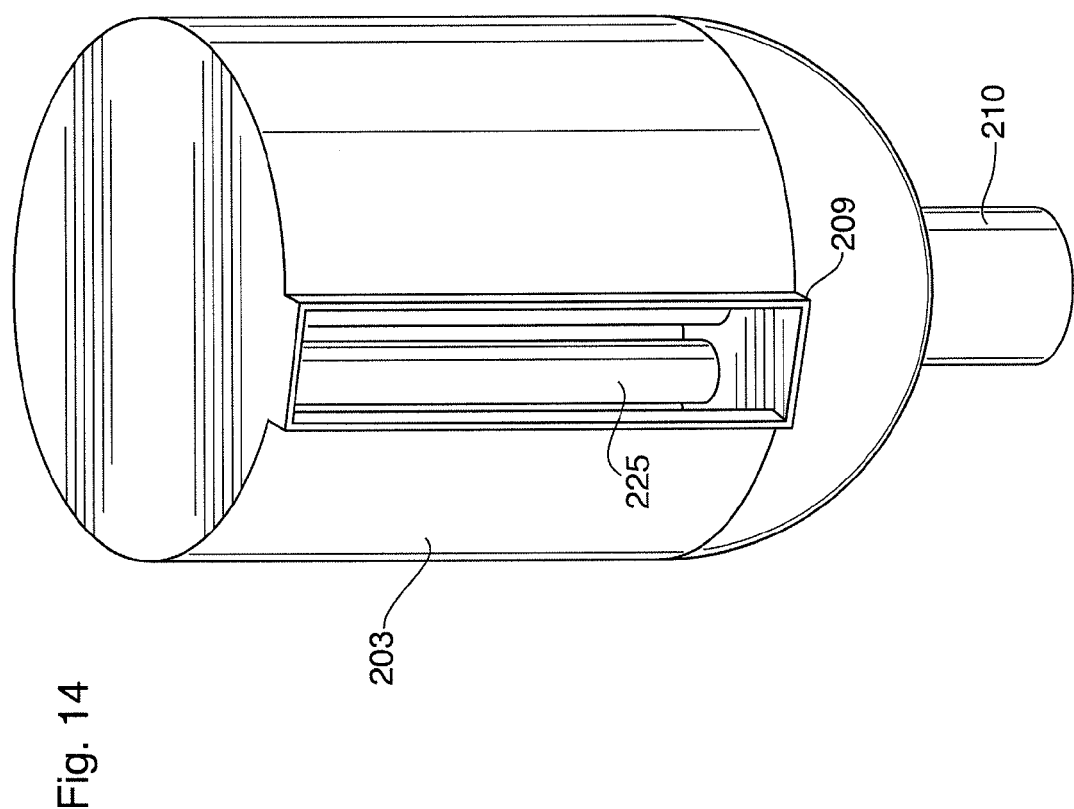
Figure 15:
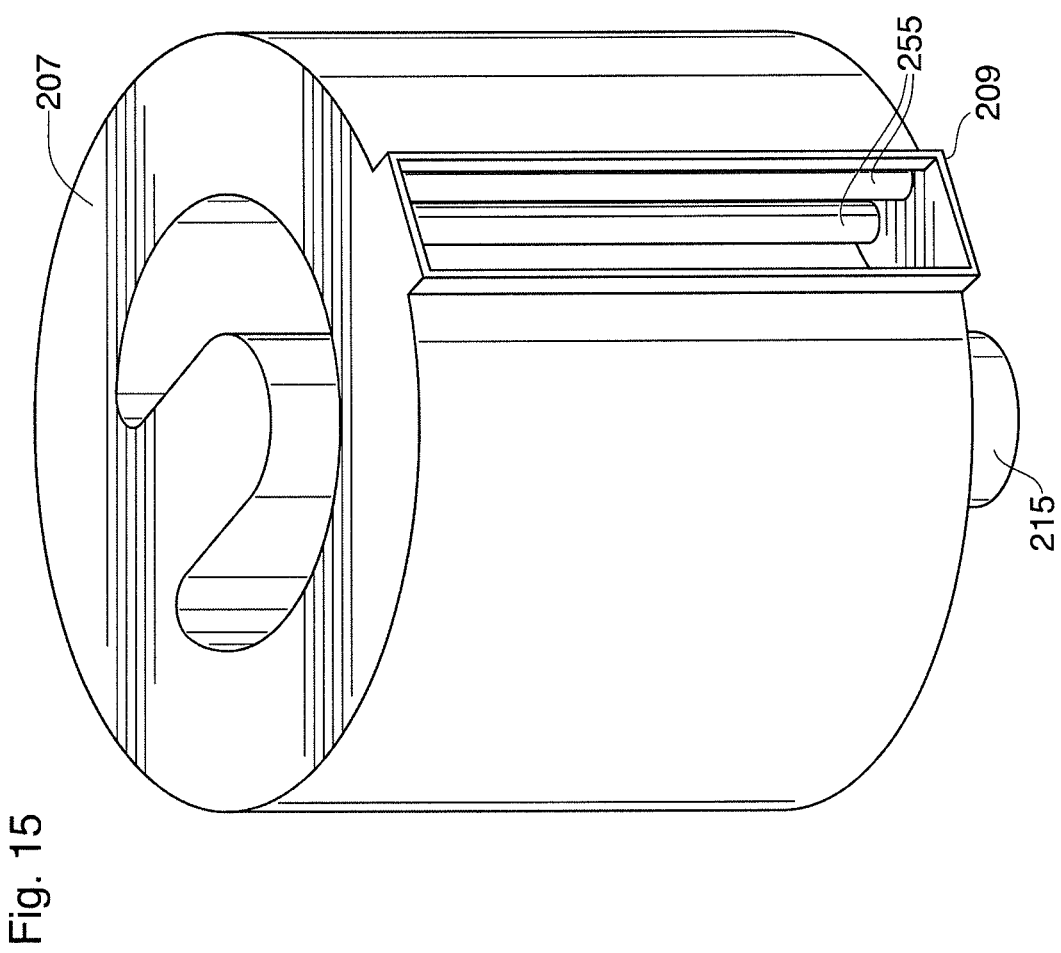
Figure 16:
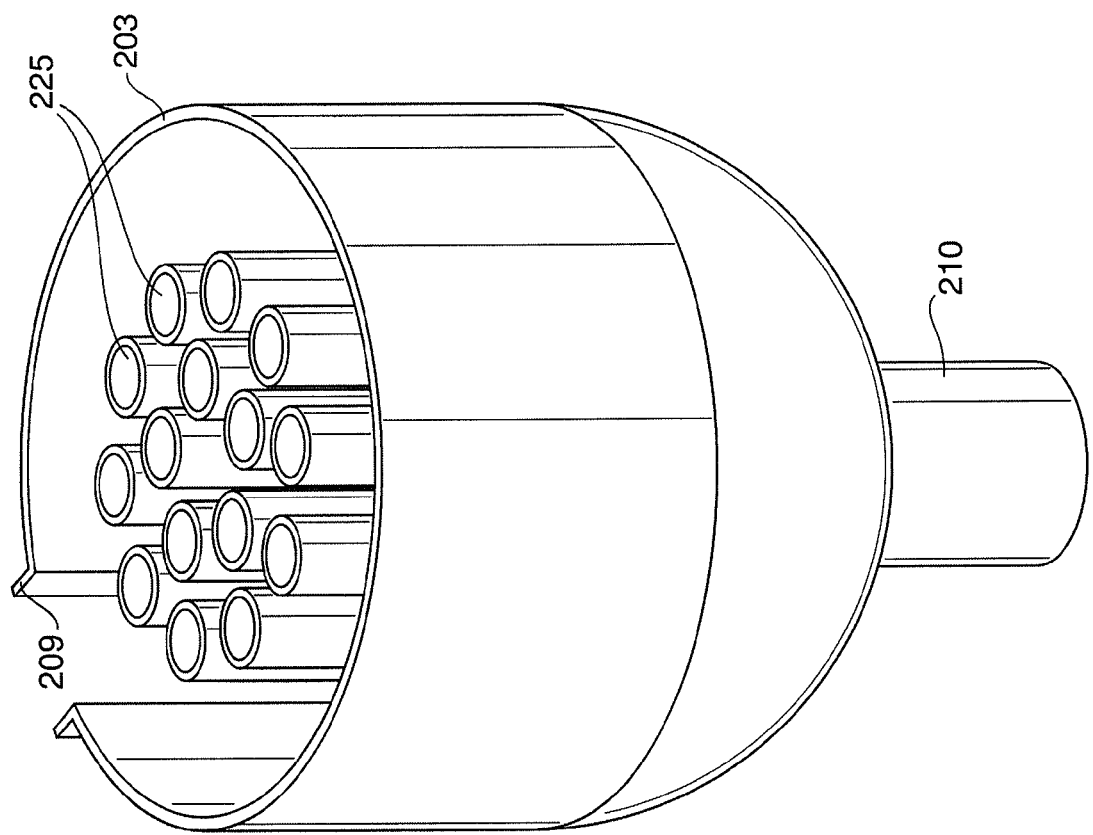
Figure 17:
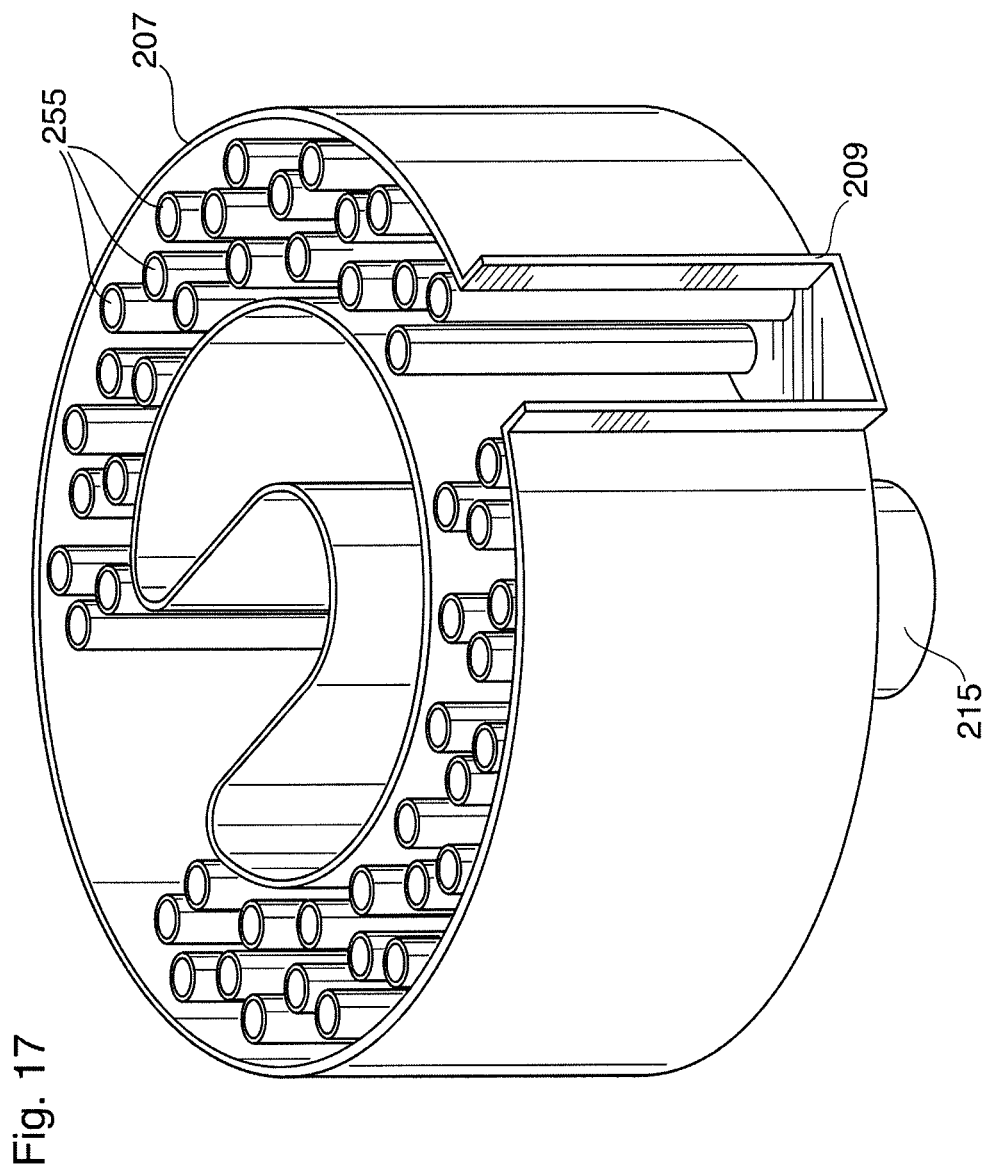
Figure 18:
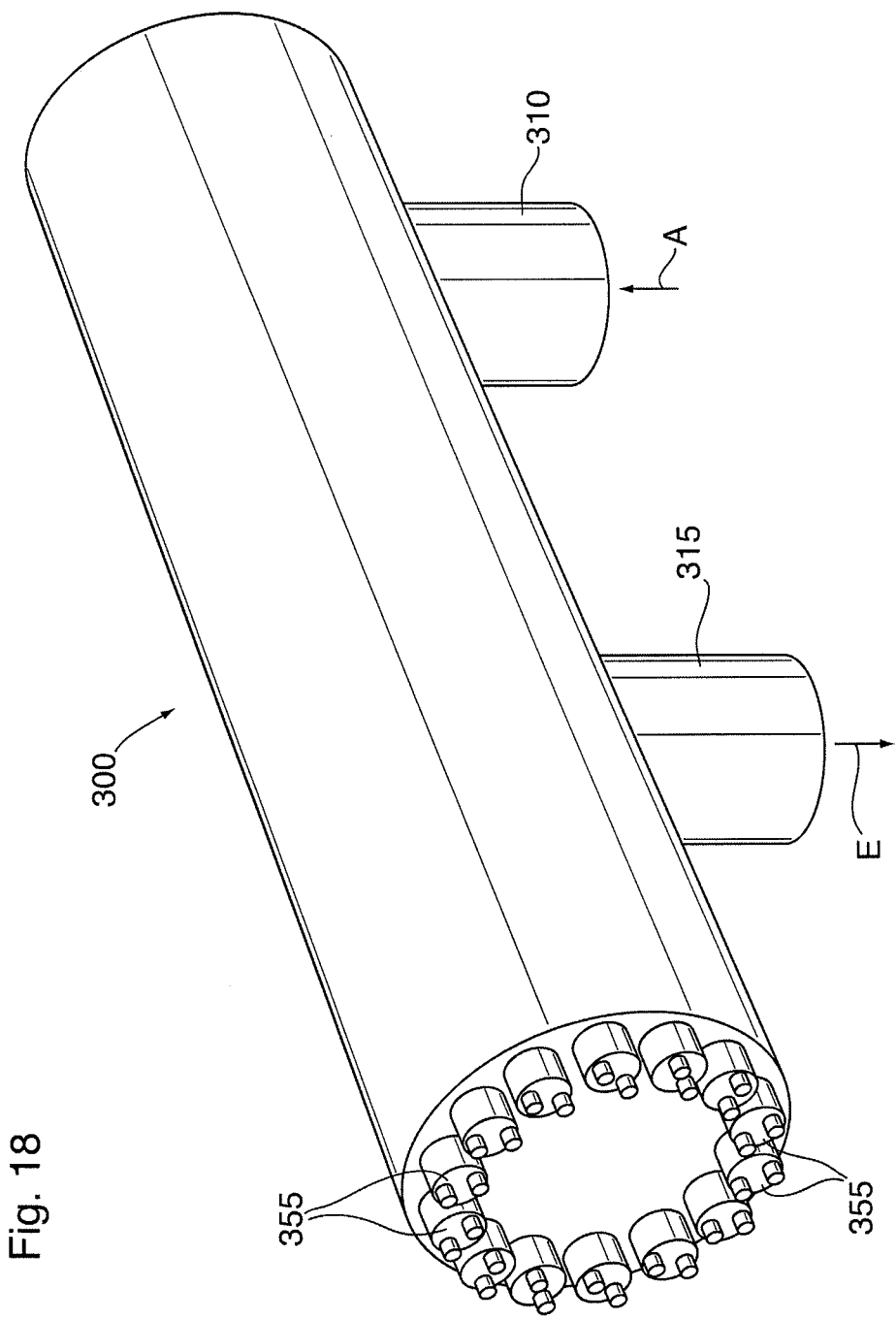
FIGS. 18-21 illustrate various views of a third embodiment of the present fluid treatment system.
Figure 19:
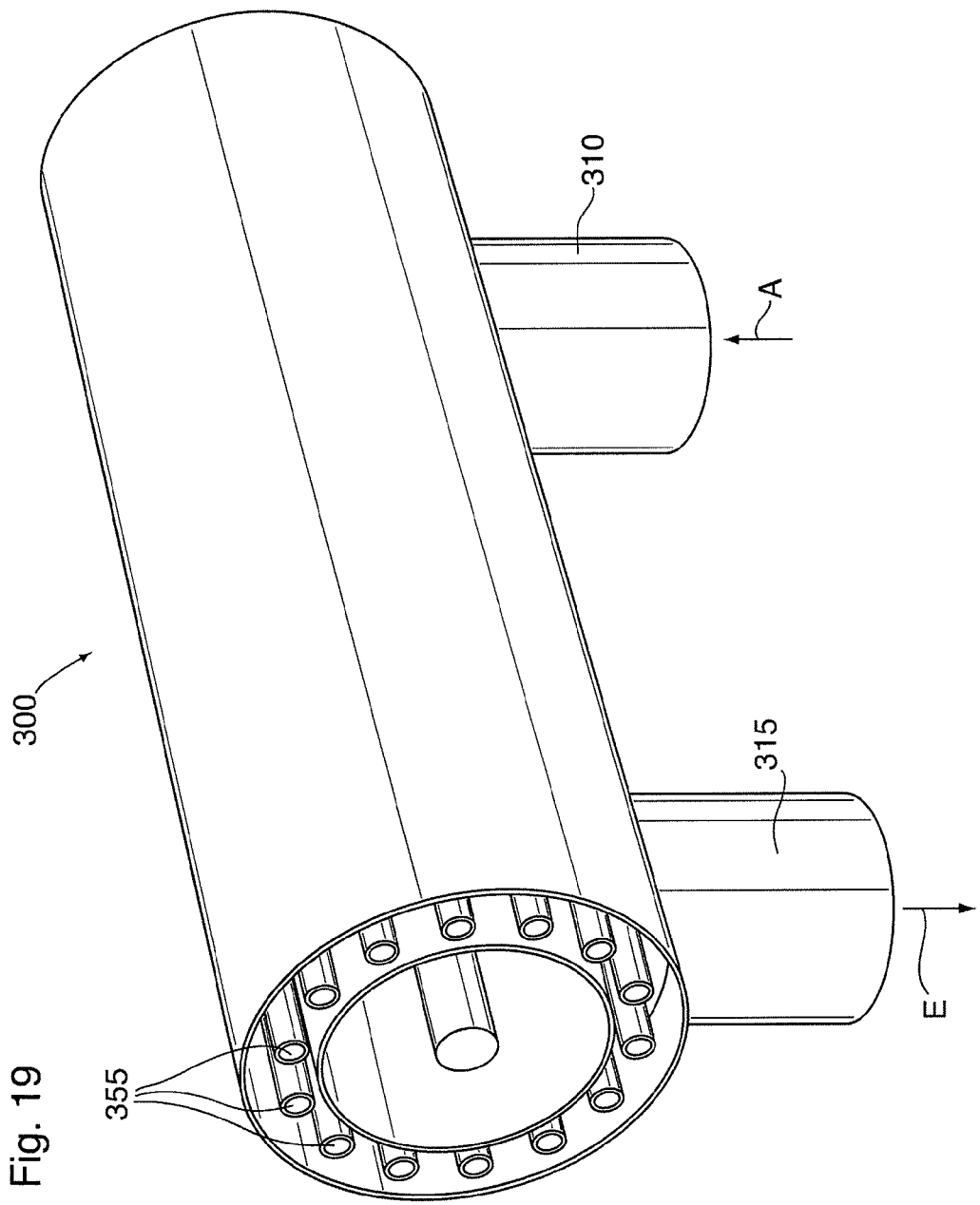

Thus, in fluid treatment system 200, candle filters 225 are disposed in a first housing 203 in fluid communication with fluid inlet 210 and radiation source assemblies 255 are disposed in a second housing 207 in fluid communication with fluid outlet 215. First housing 203 and second housing 207 are in fluid communication with one another via a joining element 209. With particular reference to FIG. 11, first housing 203, second housing 207 and joining element 209 combine to form a unitary housing to contain the flow of fluid.

Preferably, joining element 209 has a major dimension that is configured to be similar to the height of first housing 203 and second housing 207. The point is, by configuring such an inter-relationship between first housing 203, second housing 207 and joining element 209, a substantially well developed fluid flow may be established from first housing 203 to second housing 207 in which the occurrence of hydraulic head losses (or pressure changes) are reduced—i.e., compared to the situation where a relatively small cross-section conduit is used to interconnect the fluid separation components and the fluid radiation components.

With reference to FIGS. 18-22, there is illustrated a fluid treatment system 300. In FIGS. 18-22, like parts from fluid treatment system 100 in FIGS. 1-9 have the same last two digits as like parts in fluid treatment system 300 (e.g., for example, radiation source assemblies 155 in fluid treatment system 100 are denoted as radiation source assemblies 355 in fluid treatment system 300, fluid inlet 110 in fluid treatment system 100 is denoted as fluid inlet 310 in fluid treatment system 300, etc.).

As shown, fluid treatment system 300 does not incorporate candle filters 125 and 225 utilized in fluid treatment systems 100 and 200, respectively, described above. Rather, fluid treatment system 300 utilizes a primary filter screen 326 and secondary filter screen 329 that are separated by a chamber 328.

Figure 20:
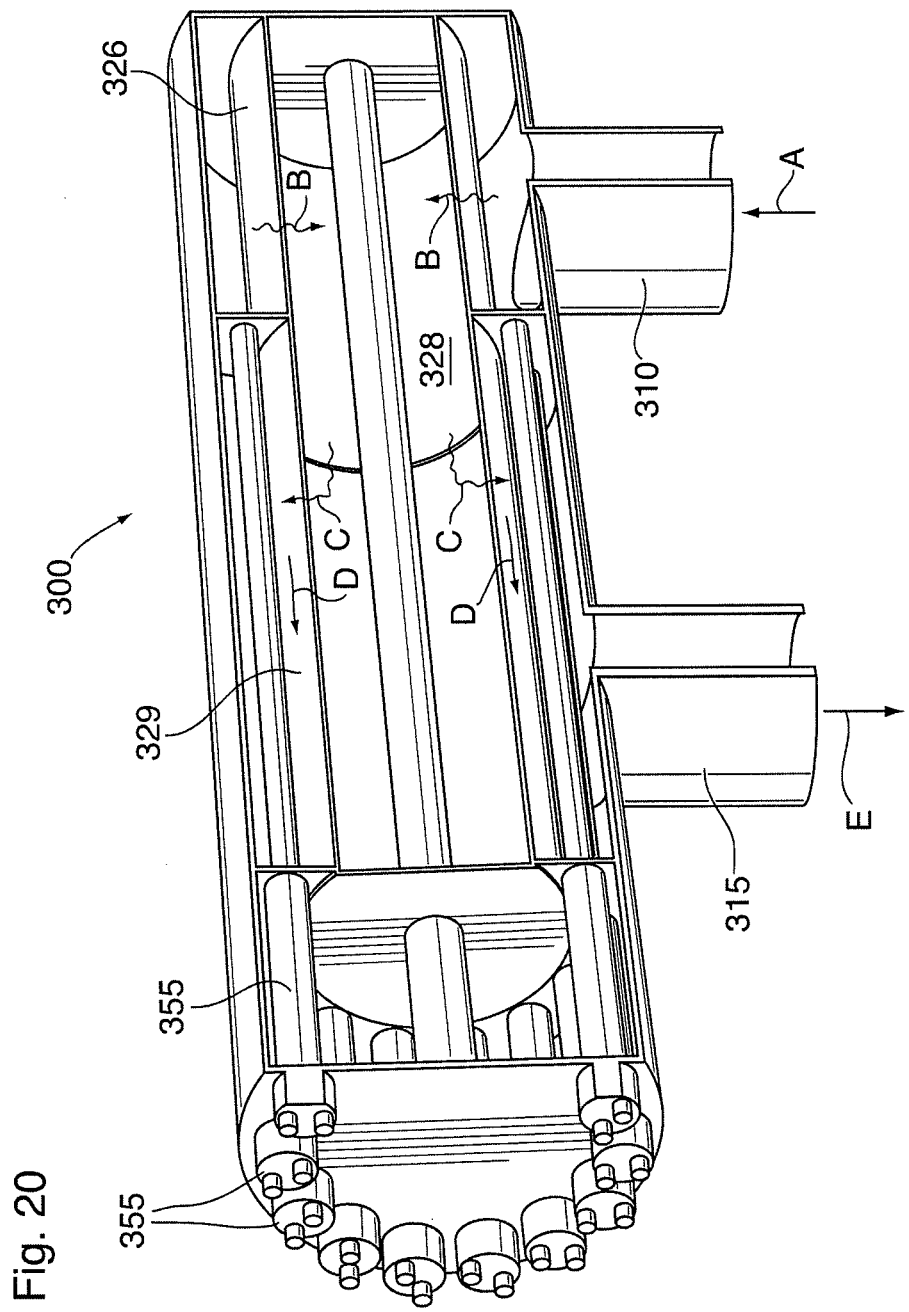
Figure 21:
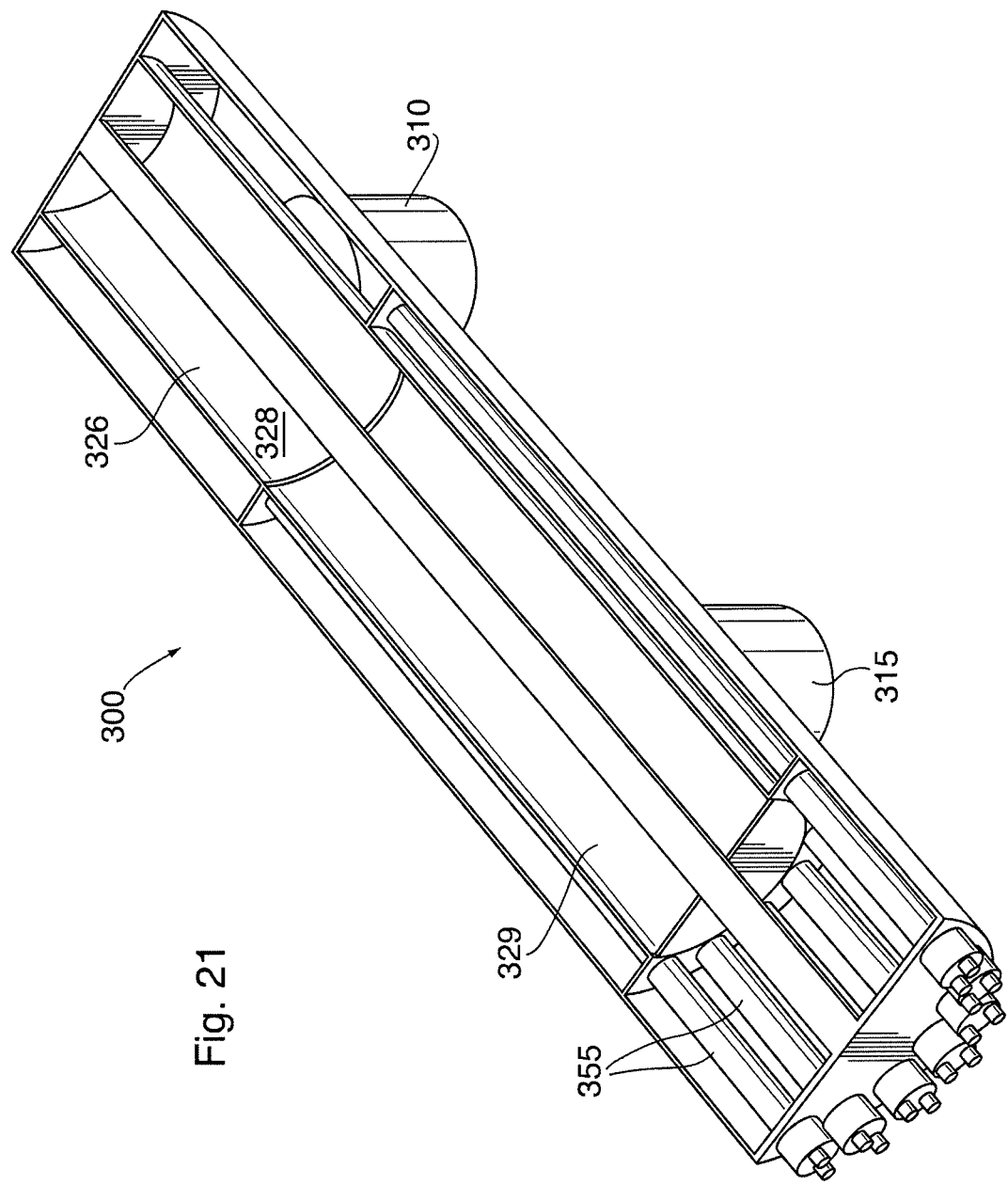

With particular reference to FIG. 20, fluid flow enters fluid inlet 310 via arrow A. The fluid then passes through primary filter screen 326 via arrows B and enters chamber 328. Next, the fluid passes through secondary filter screed 329 via arrows C whereupon it is irradiated as it travels in the direct of arrow D. The treated fluid exits fluid outlet 315 via arrow E.

Figure 22:
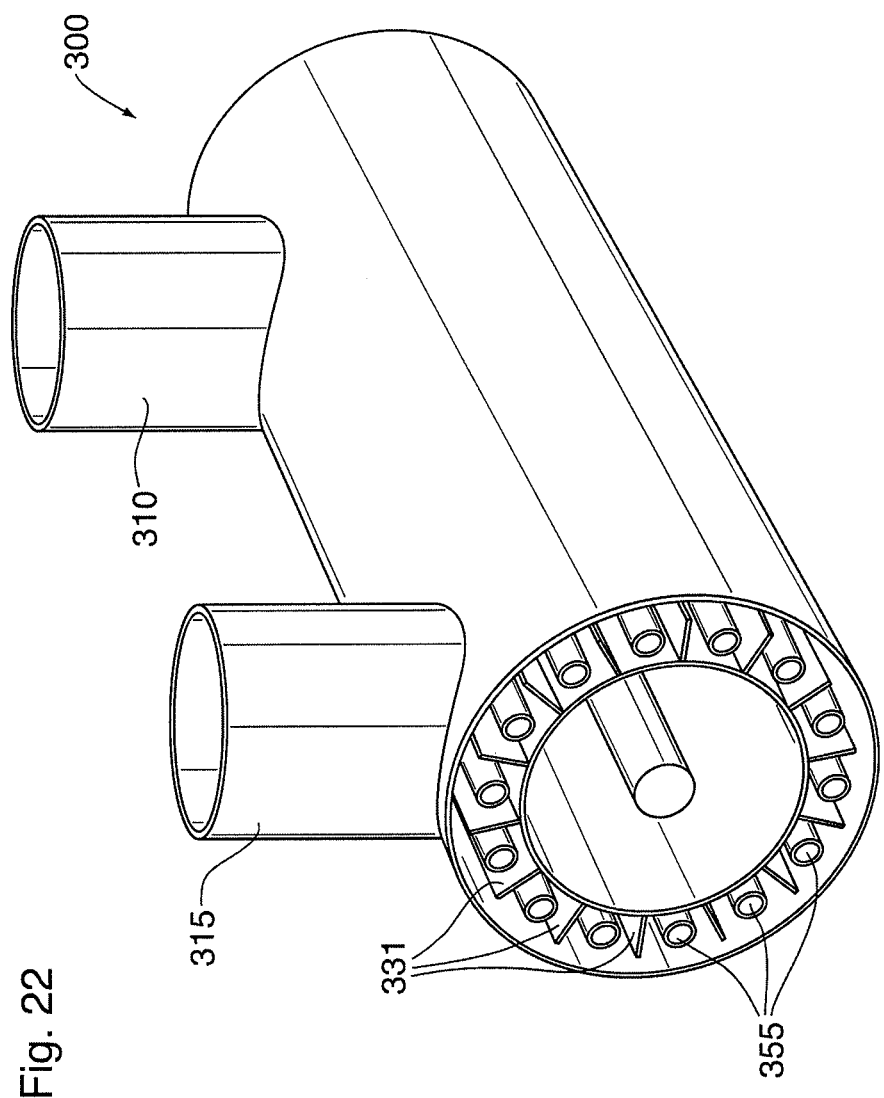
FIG. 22 illustrates a view of a modified version of the fluid treatment system illustrated in FIGS. 18-21.
Figure 23:
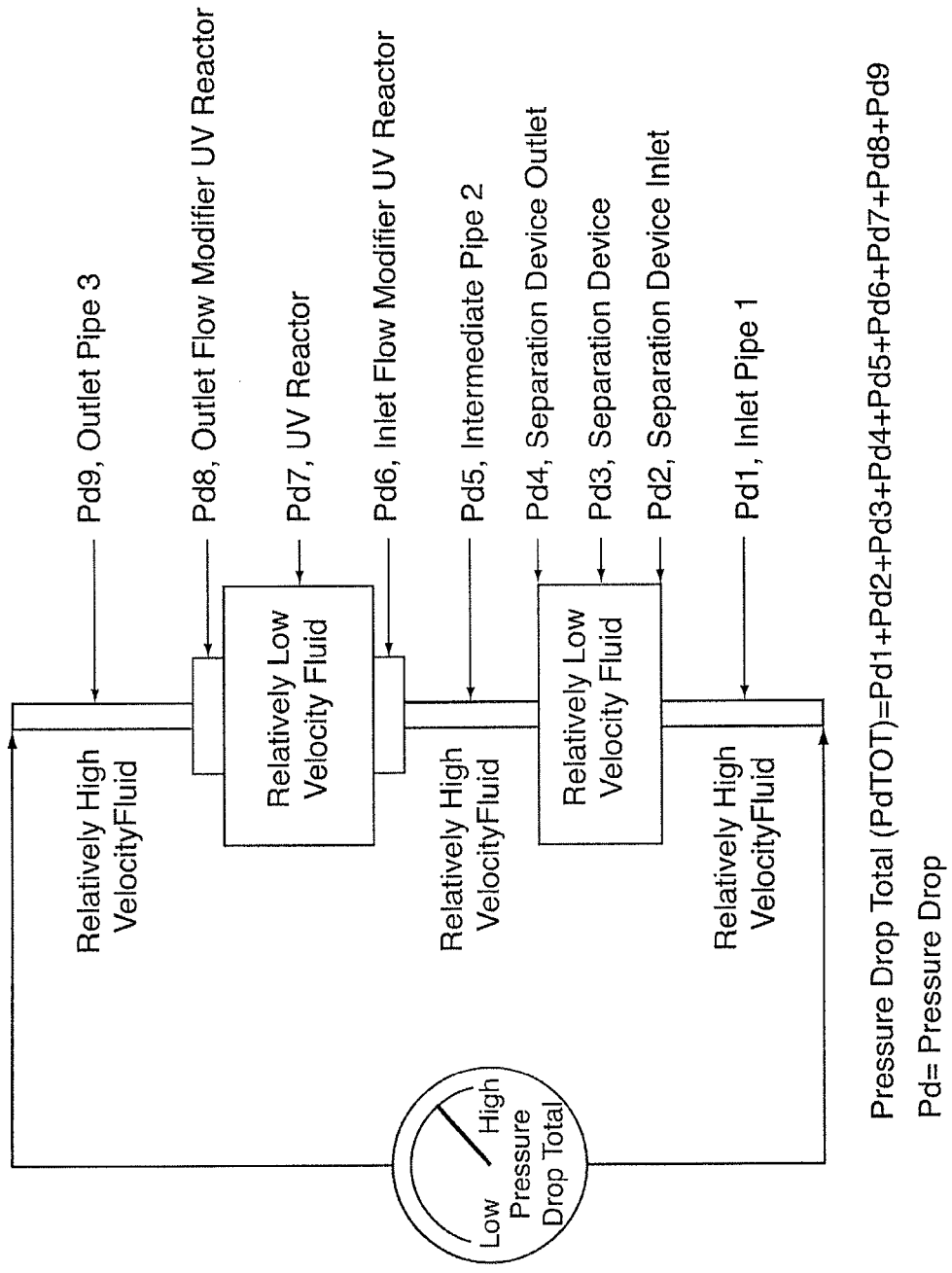
FIG. 23 illustrates a schematic view of a conventional approach to fluid treatment.
Figure 24:
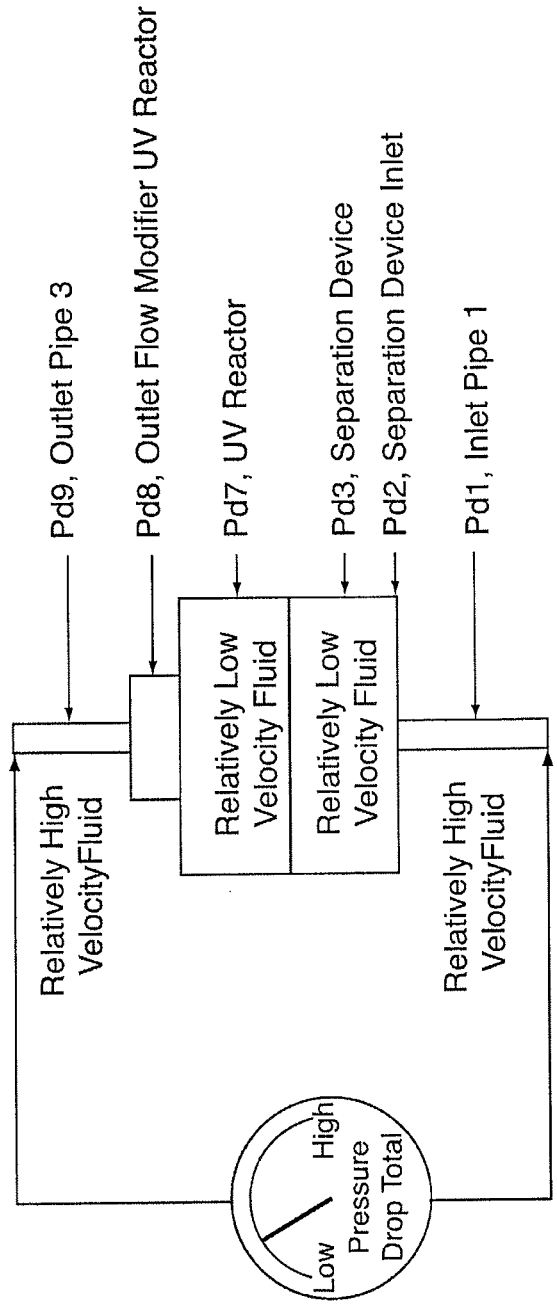
FIG. 24 illustrates a schematic view of a fluid treatment approach utilized by the present fluid treatment system.

With reference to FIG. 22, there is shown a modification of fluid treatment system 300 wherein a baffle plate 331 is interposed between each pair of radiation source assemblies 355. The use of baffle plates 331 obviates or mitigates short circuiting of the fluid as it is irradiated. As is known in the art, "short circuiting" occurs when fluid passes through a fluid treatment zone beyond a pre-determined distance at which the prescribed radiation dose is received by the fluid.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment system comprising:
a pressurized fluid inlet;
a pressurized fluid outlet; and
a pressurized fluid treatment zone in fluid communication with the pressurized fluid inlet and the pressurized fluid outlet, the pressurized fluid treatment zone comprising a cylindrical unitary housing having at least one longitudinal axis and within which is disposed:
a unitary housing having a fluid separation section configured to remove solids contained in fluid being treated in the fluid treatment system;
a fluid radiation section disposed within the unitary housing and in fluid communication with the fluid separation section to define a developed fluid flow therethrough; and
a connecting section shroud disposed within the unitary housing and between the fluid separation section and the fluid radiation section, the shroud being configured to provide for a longitudinally-extending outlet structure configured to provide water from the fluid separation section to the fluid radiation section in a direction substantially transverse to a longitudinal axis of the fluid radiation section,
wherein the longitudinally-extending outlet structure has a major dimension in a direction of the one longitudinal axis that is greater than a minor dimension thereof, and
wherein the fluid separation section and the fluid radiation section are disposed so as to have substantially parallel but off-set longitudinal axes along a direction of fluid flow through the fluid separation section.

2. The fluid treatment system defined in claim 1, wherein the fluid separation section is in fluid communication with the fluid inlet, and the fluid radiation section is in fluid communication with the fluid outlet.

3. The fluid treatment system defined in claim 1, wherein the fluid separation section comprises at least one candle filter.

4. The fluid treatment system defined in claim 3, wherein the shroud comprises an elongate filter housing having (i) an filter inlet in fluid communication with the fluid inlet and (ii) a filter outlet in fluid communication with the fluid radiation section, the filter outlet comprising the longitudinally-extending outlet.

5. The fluid treatment system defined in claim 4, wherein the filter housing comprises a substantially cylindrical portion.

6. The fluid treatment system defined in claim 4, wherein the elongate filter housing is fluid permeable between the filter inlet and the filter outlet to allow for fluid to pass laterally from one of (i) an interior to an exterior of the filter housing and (ii) from an exterior to an interior of the filter housing.

7. The fluid treatment system defined in claim 4, wherein the filter housing comprises a filter element on substantially an entire inner surface of the filter housing.

8. The fluid treatment system defined in claim 1, wherein the fluid separation section comprises a plurality of separation elements arranged in a separation element array.

9. The fluid treatment system defined in claim 8, wherein each separation element is configured to receive a flow of fluid.

10. The fluid treatment system defined in claim 8, wherein each separation element is configured to receive an independent flow of fluid with respect to an adjacent separation element.

11. The fluid treatment system defined in claim 8, wherein each separation element is elongate.

12. The fluid treatment system defined in claim 11, wherein each separation element comprises a longitudinal axis that is substantially parallel with respect to a longitudinal axis of at least two adjacent separation elements.

13. The fluid treatment system defined in claim 11, wherein each separation element comprises a longitudinal axis that is substantially equidistant from longitudinal axis of three adjacent separation elements.

14. The fluid treatment system defined in claim 11, wherein each separation element comprises a longitudinal axis that is substantially equidistant from longitudinal axis of four adjacent separation elements.

15. The fluid treatment system defined in claim 11, wherein each separation element comprises a longitudinal axis that is substantially equidistant from longitudinal axis of five adjacent separation elements.

16. The fluid treatment system defined in claim 1, wherein the fluid radiation section comprises at least one elongate radiation source assembly.

17. The fluid treatment system defined in claim 16, wherein the at least one elongate radiation source comprises an ultraviolet radiation source.

18. The fluid treatment system defined in claim 16, wherein the elongate radiation source assembly comprises a longitudinal axis that is configured to be transverse to the direction of fluid flow through the fluid radiation section.

19. The fluid treatment system defined in claim 1, wherein the fluid separation section and the fluid radiation section are disposed serially along a direction of fluid flow through the fluid treatment zone.

20. A fluid treatment system comprising:
a pressurized fluid inlet;
a pressurized fluid outlet;
a closed fluid treatment zone in fluid communication with the pressurized fluid inlet and the pressurized fluid outlet, the fluid treatment zone comprising a unitary housing, the housing comprising (a) a first chamber in fluid communication with the fluid inlet and within which is disposed at least one fluid separation section configured to remove solids contained in fluid being treated in the fluid treatment system, and (b) a second chamber in fluid communication with the fluid outlet and the first chamber, the second chamber having disposed therein at least one radiation source assembly to define a developed fluid flow therethrough; and a connecting section shroud disposed within the unitary housing and between the fluid separation section and the radiation source assembly, the shroud being configured to provide for longitudinally-extending outlet structure configured to provide water from the fluid separation section to the radiation source assembly in a direction substantially transverse to a longitudinal axis of the radiation source assembly, wherein the first chamber and the second chamber are disposed so as to have substantially parallel but off-set longitudinal axes with respect to one another, and wherein the longitudinally-extending outlet structure has a major dimension in a direction of said longitudinal axes that is greater than a minor dimension thereof.

21. A fluid treatment system comprising:
a pressurized fluid inlet;
a pressurized fluid outlet;
a pressurized fluid treatment zone in fluid communication with the pressurized fluid inlet and the pressurized fluid outlet, the pressurized fluid treatment zone comprising a unitary housing within which is disposed a fluid separation section configured to remove solids contained in fluid being treated in the fluid treatment system and a fluid radiation section in fluid communication with one another; and
a connecting section shroud disposed between the fluid separation section and the fluid radiation section, the shroud being configured to provide for longitudinally-extending outlet structure configured to provide water from the fluid separation section to the fluid radiation section in a direction substantially transverse to a longitudinal axis of the fluid radiation section, wherein the fluid separation section comprises a plurality of separation elements arranged in a separation element array, wherein the fluid separation section and the fluid radiation section are disposed so as to have substantially parallel but off-set longitudinal axes along a direction of fluid flow through the fluid separation section, and wherein the longitudinally-extending outlet structure has a major dimension in a direction of said longitudinal axes that is greater than a minor dimension thereof.

22. The fluid treatment system defined in claim 21, wherein each separation element is configured to receive a flow of fluid.

23. The fluid treatment system defined in claim 21, wherein each separation element is configured to receive an independent flow of fluid with respect to an adjacent separation element.

24. The fluid treatment system defined in claim 21, wherein each separation element is elongate.

25. The fluid treatment system defined in claim 24, wherein each separation element comprises a longitudinal axis that is substantially parallel with respect to a longitudinal axis of at least two adjacent separation elements.

26. The fluid treatment system defined in claim 24, wherein each separation element comprises a longitudinal axis that is substantially equidistant from longitudinal axis of three adjacent separation elements.

27. The fluid treatment system defined in claim 24, wherein each separation element comprises a longitudinal axis that is substantially equidistant from longitudinal axis of four adjacent separation elements.

28. The fluid treatment system defined in claim 24, wherein each separation element comprises a longitudinal axis that is substantially equidistant from longitudinal axis of five adjacent separation elements.

* * * * *